United States Patent [19]
Nakai

[11] Patent Number: 6,075,618
[45] Date of Patent: Jun. 13, 2000

[54] TERMINAL PRINTER CONNECTED TO A PLURALITY OF HOST DEVICES

[75] Inventor: Shizuo Nakai, Tenri, Japan

[73] Assignee: Sharp Kabushiki Kaisha, Osaka, Japan

[21] Appl. No.: 09/014,710

[22] Filed: Jan. 28, 1998

[30] Foreign Application Priority Data

Jan. 28, 1997 [JP] Japan .................................... 9-013894

[51] Int. Cl.[7] .............................. G06F 15/00; G06K 1/00
[52] U.S. Cl. ...................... 358/1.16; 358/1.13; 358/1.14; 358/1.15; 705/21; 711/153; 711/173
[58] Field of Search ..................................... 395/112, 113, 395/114, 115, 116; 370/328, 235, 229; 705/21, 15, 34; 186/38; 235/3; 711/153, 170, 173; 283/60.2

[56] References Cited

U.S. PATENT DOCUMENTS

| | | | |
|---|---|---|---|
| 3,810,109 | 5/1974 | Morris et al. | 711/172 |
| 4,415,065 | 11/1983 | Sandstedt | 705/34 |
| 4,785,396 | 11/1988 | Murphy et al. | 710/106 |
| 4,896,319 | 1/1990 | Lidinsky et al. | 370/427 |
| 5,453,982 | 9/1995 | Pennington et al. | 370/235 |
| 5,559,797 | 9/1996 | Murase | 370/412 |
| 5,625,757 | 4/1997 | Kageyama et al. | 395/113 |
| 5,659,670 | 8/1997 | AuClair | 358/1.16 |
| 5,774,356 | 6/1998 | Hisatake et al. | 364/148.01 |
| 5,909,547 | 6/1999 | Mitra | 709/213 |

FOREIGN PATENT DOCUMENTS

| | | |
|---|---|---|
| 3-26582 | 2/1991 | Japan . |
| 3-30978 | 2/1991 | Japan . |
| 5-309912 | 11/1993 | Japan . |
| 5-338278 | 12/1993 | Japan . |
| 5-341926 | 12/1993 | Japan . |
| 5-341927 | 12/1993 | Japan . |
| 7-13719 | 1/1995 | Japan . |

*Primary Examiner*—Edward L. Coles
*Assistant Examiner*—David Rosenblum
*Attorney, Agent, or Firm*—Nixon & Vanderhye P.C.

[57] ABSTRACT

A terminal printer can simultaneously receive print data from a plurality of host devices. The terminal printer has one reception buffer memory to which reception buffers are allocated on the basis of number information of the connected host devices, and a buffer management memory which manages the reception buffer memory. The buffer management memory is configured by region which respectively store terminal addresses of the host devices using the reception buffers, and regions which respectively store serial numbers of lastly received packets in correspondence with the reception buffers. When a packet is received, the terminal address of the host device included in the packet is compared with the terminal addresses stored in the buffer management memory. Subsequently, the packet is stored into the reception buffer of the reception buffer memory which is designated by the coincident terminal address.

8 Claims, 23 Drawing Sheets

FIG. 5

| LPN1 | buf1SA | buf1P | buf1EA | buf1HA |
|------|--------|-------|--------|--------|
| LPN2 | buf2SA | buf2P | buf2EA | buf2HA |
| LPN3 | buf3SA | buf3P | buf3EA | buf3HA |
| ⋮ | ⋮ | ⋮ | ⋮ | ⋮ |
| LPNN | bufNSA | bufNP | bufNEA | bufNHA |

FIG. 6

| HA1 | siz1 |
|-----|------|
| HA2 | siz2 |
| HA3 | siz3 |
| ⋮ | ⋮ |
| HAM | sizM |

| HA1 | EMA1 | siz1 |
| --- | --- | --- |
| HA2 | EMA2 | siz2 |
| HA3 | EMA3 | siz3 |
| ⋮ | ⋮ | ⋮ |
| HAM | EMAM | sizM |

FIG. 14

| | | | | | |
|---|---|---|---|---|---|
| LPN1 | buf1SA | buf1P | buf1EA | buf1CA | buf1HA |
| LPN2 | buf2SA | buf2P | buf2EA | buf2CA | buf2HA |
| LPN3 | buf3SA | buf3P | buf3EA | buf3CA | buf3HA |
| ..... | ..... | ..... | ..... | ..... | ..... |
| LPNN | bufNSA | bufNP | bufNEA | bufNCA | bufNHA |

TERMINAL PRINTER CONNECTED TO A PLURALITY OF HOST DEVICES

BACKGROUND OF THE INVENTION

1. Field of the Invention

The present invention relates to a terminal printer which, in a system wherein a plurality of host devices and the terminal printer are connected to each other via an interface configured by a single line, can receive one or more packetized data transmitted from the plurality of host devices.

2. Description of the Related Art

Conventionally, printers comprising a plurality of input buffers which temporarily hold data received via an interface, and having a plurality of print modes which can be arbitrarily switched over, such as a character mode, a bit image mode and so on, have been proposed.

For example, Japanese Unexamined Patent Publication JP-A 5-338278 (1993) discloses a printer comprising: a temporary buffer which is equal in capacity to the largest one of the plurality of input buffers; structure for changing an input pointer for managing an input of the input buffers, onto one of the plurality of input buffers; structure for transferring contents of an input buffer which is selected by the input pointer designated before a change of the input pointer, to the temporary buffer; structure for changing an output pointer for managing an output of the input buffers, onto the temporary buffer; and structure for, at a timing when the temporary buffer becomes empty, changing the output pointer onto an input buffer designated as a result of the change of the input pointer. According to this configuration, for each print mode, the position and size of the input buffer can be set arbitrarily and in real time.

At least one of the input buffers is set to have a size in the unit of 1 byte or 256 bytes, so that a reception buffer used in the character mode can be used for another purpose as it is. When the buffer is used as a print buffer, for example, the printout of a bit image can be further accelerated. Furthermore, the means for transferring contents of an input buffer designated before a change of the input pointer to the temporary buffer, and the means for transferring contents of the temporary buffer to the input buffer designated after the change of the input pointer are realized by hardware. As a result, the hardware serving as the temporary buffer is configured as a detachable cartridge.

Japanese Unexamined Patent Publication JP-A 5-341926 (1993) discloses a printer comprising: structure for, at a timing when a mode is switched over, stopping data reception; structure for, at a timing when an input buffer becomes empty, changing a pointer for managing an input/output of the input buffer; and structure for restarting data reception, wherein for each print mode, the position and capacity of the input buffer can be arbitrarily set.

Furthermore, the capacity of the input buffer in at least one mode is set to be in the unit of 1 byte or 256 bytes, so that the capacity of a reception buffer used in the character mode can be used for another purpose as it is. When the buffer is used as a print buffer, for example, the printout of a bit image can be further accelerated. Moreover, the input buffer in at least one mode is configured so as to be incorporated into a detachable cartridge.

Japanese Unexamined Patent Publication JP-A 5-341927 (1993) discloses a printer comprising: structure for, at a timing when a mode is switched over, stopping data reception; structure for changing an input pointer for managing an input of input buffers, onto one of the plurality of input buffers; structure for restarting data reception; structure for transferring contents of an input buffer which is selected by the input pointer designated before a change of the input pointer, to an input buffer designated as a result of the change of the input pointer; and structure for changing an output pointer for managing an output of the input buffers, onto the input buffer designated after the change of the input pointer, wherein for each print mode, the position and size of the input buffer can be set arbitrarily and in real time.

Furthermore, at least one of the plurality of input buffers is set to have a size in the unit of 1 byte or 256 bytes, so that a reception buffer used in the character mode can be used for another purpose as it is. When the buffer is used as a print buffer, for example, the printout of a bit image can be further accelerated. Moreover, at least one of the plurality of input buffers is configured so as to be incorporated into a detachable cartridge.

All of the above-described prior arts have an object of providing an economical printer in which the position and size of an input buffer are changed whenever necessary and in real time to an optimum state in accordance with the feature of each mode, thereby improving the throughput.

Conventionally, a system is known in which the plurality of electronic cash registers (ECRs) or POS terminals (hereinafter, ECRs and POS terminals are generally referred to as HOSTs) share a single terminal printer via a network.

In the food dispensing business such as restaurants for example, a printer for a kitchen (a so-called kitchen printer) is used so that print data indicative of order information inputted from a plurality of order terminals are printed out by the printer disposed in the kitchen.

Such a terminal printer uses a print record sheet in the form of roll paper or sprocket paper. When the terminal printer receives a series of packetized print data transmitted from the plurality of order terminals (host devices), a series of print data requested by the same order terminal must be outputted in a single continuous region of a print record sheet. In other words, the terminal printer must be controlled so that print contents from the plurality of order terminals are not mixedly outputted. Hereinafter, a series of packetized print data are referred to as transmission data. Namely, the transmission data are configured by one or more packets. Each packet is configured by data relating to the control of the packet, and a part of print data.

FIG. 22 is an external view of such a terminal printer. The terminal printer is connected to host devices (HOSTs) via an interface 9. An inspection window 12 for journal record sheets, and an ejection port 11 for a receipt record sheet are disposed on a main body of the printer. The printer further comprises switches 13 for a sheet feed and an online/offline control, and a display device 14 which displays the error state and the online/offline state. Depending on the use of the terminal printer, one of the journal record sheets may be omitted.

FIG. 23 is a block diagram showing the electrical configuration of the terminal printer. The terminal printer comprises: a central processing unit (CPU) 1 which controls the operation of the printer; a communication control unit 2 which transmits and receives print data and commands via the interface 9 to the HOSTS; a ROM 3 which stores programs for controlling the printer and a character generator; a RAM 4 which is used as a reception buffer or a work area for the CPU 1; an input/output device 8 which comprises a display device, switches, a buzzer, and the like; an input/output control unit 5 which controls the input/output device 8; a print mechanism 7 which comprises a print head and a sheet feeder; and a print mechanism control unit 6 which controls the print mechanism 7. The input/output device 8 is indicated so as to collectively represent all input/output devices other than the print mechanism 7, including a display device such as an LED display device or an LCD display device, a buzzer, various setting switches, and operation keys. Similarly, the input/output control unit 5 is indicated so as to collectively represent all input/output control units for controlling the input/output device 8 other than the print mechanism 7. The communication control unit 2, the ROM 3, the RAM 4, the input/output control unit 5, and the print mechanism control unit 6 are respectively connected to the CPU 1 via a bus 10 and configured so that control information is transmitted among the respective blocks directly or by way of the CPU 1.

In the above configuration, print data transmitted from the HOSTs are received via the interface 9 and then sequentially stored into a reception buffer memory disposed in the RAM 4.

In accordance with a data analysis program stored in the ROM 3, partial data of the print data is sequentially fetched from a packet in the reception buffer memory and then classified into character data, print control commands, etc. Thereafter, bit map information of the print image, which is prepared on the basis of the character data and print control commands, is transmitted to a print line buffer disposed in a specific region of the RAM 4.

A print image in the print line buffer is expanded into, for example, a print start command and a specified bit map conforming to the width of a record sheet, and then sent to the print mechanism 7 via the print mechanism control unit 6. Thereafter, a print operation is executed.

FIG. 24 shows an example in which such prior art terminal printers 26 and 27 are connected to HOSTs 21 to 25 via the interface 9. In the example, the five HOSTs 21 to 25 and the two terminal printers 26 and 27 are connected to each other through the interface 9. When data are printed out simply in the reception sequence of packets, print data from different HOSTs mixedly exist in a series of print outputs because the plurality of HOSTs 21 to 25 are connected on a single network as shown in FIG. 24. Such a case where data of different HOSTs mixedly exist will be described below with reference to FIGS. 25 to 28.

FIG. 25 is a timing chart of a case where the HOSTs 21 and 22 request the print outputs shown in FIGS. 26 and 27, respectively.

In the example shown in FIG. 25, the HOST 21 transmits at time t1 a portion indicative of a print block A1 in first print data and shown in FIG. 26 as one packet AA1, and at time t3 a portion indicative of a print block A2 in the first print data as one packet AA2. On the other hand, the HOST 22 transmits at time t2 a portion indicative of a print block B1 in second print data and shown in FIG. 27 as one packet BB1, and at time t4 a portion indicative of a print block B2 in the second print data as one packet BB2.

When the packets which are transmitted in these timings are received by, for example, the terminal printer 26 in the reception sequence, and the contents of the reception buffer memory are sequentially printed, a print output in which the print blocks A1, B1, A2, and B2 are arranged in this sequence as shown in FIG. 28 is obtained. In other words, the printout is conducted in the sequence of the packet AA1, the packet BB1, the packet AA2, and the packet BB2.

In the prior art terminal printers 26 and 27, in order to solve the problem, means for identifying the station number of the HOST of packets the reception of which is once started is disposed, and transmission from another HOST is not received until transmission of the series of packets is completed.

FIG. 29 shows an example of a packet configuration which is required for such a control.

In the case where terminal printers are connected via a network, usually, a packet configuring transmission data is formed by a frame which includes information for controlling the physical layer of the network, in the top region of the packet. In the example, information for controlling the physical layer of the network is omitted. Specifically, a portion shown in FIG. 29 indicates an information region in which a region in the frame configuring the packet and corresponding to a data portion is previously signified among the HOSTs and the terminal printers, and bit serial information in the packet is shown being partitioned in the unit of a field. Hereinafter, the fields are abbreviated as P1 to P4 in the sequence starting from the top, respectively.

P1 is a field wherein a terminal address of address information of the network allocated to a terminal HOST is stored. Hereinafter, a terminal address is referred to as HA. P2 is a field wherein a last packet flag is stored. The last packet flag indicates whether or not the packet is the end of a series of packets in which a packet from another HOST should not exist, or whether or not the packet is the last packet which is lastly transmitted among the plurality of packets constituting one set of print data. Hereinafter, the last packet flag is referred to as LF. P3 is a field indicating a serial number of the packet which is assigned to each of the series of packets in the sequence starting from the top. Hereinafter, the serial number of a packet is referred to as PN. Usually, the PN is used for preventing duplicated reception of the same packet and omission of a packet from occurring. P4 is a field containing print control commands and character data which are to be actually supplied to the terminal printer. Hereinafter, print commands and data are collectively referred to as DATA.

FIG. 30 is a flowchart showing reception of print data in the prior art terminal printer having the above packet configuration. In FIG. 30, "INRX" is a flag indicating that a packet is currently received, "LHA" is storage for storing an HA in a received packet, and "LPN" is storage for storing a PN in the received packet.

Under the state of waiting for reception of a packet (step S101), it is judged whether reception of one packet is completed or not (step S102). When a packet is received, the operation proceeds to step S103. In step S103, it is judged whether or not a series of packets consisting of the plurality of packets, i.e., transmission data are currently received. When a series of packets are currently received, i.e., INRX= 1, the operation proceeds to step S104 in which it is judged whether or not the terminal address (HA) is identical with the HA of the previously received packet, or whether or not the HA of the packet that has been normally received in the previous processing of the flowchart.

When it is judged in step S104 that the terminal address of the HOST is not identical with that of the previously received packet, the operation proceeds to step S108 to transmit to the HOST a negative acknowledge packet indicating that the packet has not been normally received.

By contrast, when it is Judged in step S104 that the terminal address of the HOST is identical with that of the previously received packet, the operation proceeds to step S105 and it is checked whether the received packet number is the subsequent serial number or not. When the serial number (PN) is not larger than the previous serial number (PN) by 1, the operation proceeds to step S108 to transmit to the HOST the negative acknowledge packet indicating that the packet has not been normally received. By contrast, if the serial number (PN) is larger than the serial number (PN) of the previously received packet by 1, it is assumed that the packet reception sequence is normally maintained, and the operation proceeds to step S106. It is checked whether or not the empty area of the reception buffer memory is sufficient for storing the packet which is received at this time. Thereafter, the operation proceeds to step S107 in which a positive acknowledge packet is sent to the HOST, and then to step S109 to copy the data P4 shown in FIG. 29 to the reception buffer memory.

Thereafter, the operation proceeds to step S110 to judge whether the packet is the last packet or not. When the packet is the last packet [LF=1], the operation proceeds to step S111. The INRX and the LPN are initialized and the operation then returns to step S101 to wait for reception of a packet. When it is judged in step S110 that a series of packets are currently received [LF=0], the operation proceeds to step S112. The INRX is set to be 1, the HA is stored into the LHA, and the PN is stored into the LPN. Thereafter, the operation returns to step S101 to wait for reception of a packet.

As described above, control in the prior art is conducted so that, during a period of LF=0 (the packet is not the last packet), when the HA is not a value which is currently received, a negative acknowledge is returned to the HOST and reception of the packet is disabled, thereby preventing erroneous mixture of the packet from occurring.

The packet configuration of the prior art has the following problem. After one of the HOSTs once starts the packet transmission, even when another HOST wishes to transmit print data in a period between a packet and the subsequent packet, any reception is rejected by a negative acknowledge packet or a so-called busy acknowledge. As a result, even when an idle time exists between packets, data transmission must wait until the current transmission of print data of the one HOST is completed. Therefore, this causes the throughput to be extremely impaired.

In a printer disclosed in Japanese Unexamined Patent Publication JP-A 3-26582 (1991), in order to manage and separately accumulate print data and printout results of the data for each requester of data transmitter, print data are stored into a data buffer for each internal management number which is assigned at the beginning of the communication in correspondence with the requester identifying number. When print data for one page are completed, the print data are sent together with the corresponding internal management number to a print control unit. This prior art does not describe the configuration of the data buffer for storing print data into the data buffer for each requester or each HOST, and the procedure of storing the print data into the data buffer.

Furthermore, in the prior art, since the packet reception is conducted while only the HA of a HOST is identified, there arises the following problem in the case of HOSTs having a function of multitask processing. Even when print requests are issued from the same HOST, during a period when one task processing executes a print process, another task cannot execute a print output until the print process of the task executing the print process is completed. As a result, the multitask function of the HOSTs cannot be sufficiently performed.

Other prior arts include a printer disclosed in Japanese Unexamined Patent Publication JP-A 3-30978 (1991), a wireless printer disclosed in Japanese Unexamined Patent Publication JP-A 5-309912 (1993), and a printer buffer disclosed in Japanese Unexamined Patent Publication JP-A 7-13719 (1995).

In the printer disclosed in JP-A-3-30978, respective hosts are connected to a selector of the printer via individual interface cables, the selector sequentially selects the respective cables one by one, and the selected cable is connected to an interface circuit of the printer. Each time when data for one page are received from the host, the cable is changed to another one. Therefore, in place of the interface cables, an interface which is configured by a single line and to be connected to the plurality of hosts may be connected to the selector. In this case, even when the selector selects the interface, the host is not restricted to a single one. Therefore, it is difficult to receive data from the respective hosts simultaneously.

In the wireless printer disclosed in JP-A 5-309912, priorities are previously allocated to the plurality of personal computers serving as transmitters of data, respectively. A case where, during a period when data from one of the plurality of personal computers are received and printed by wireless communication, data from another one of the personal computers are received will be considered. When the other personal computer has a higher priority than that of the one personal computer, the reception and printing of the data from the one personal computer are interrupted, and the reception and printing of the data from the other personal computer are conducted. When the other personal computer has a lower priority than that of the one personal computer, the data from the other personal computer are not received. In this case, therefore, the reception and printing of the data from the one personal computer, or those of the data from the other personal computer are stopped, with the result that the concurrent reception of data is not conducted.

In the printer buffer disclosed in JP-A 7-13719, one or more transmitting terminals and one or more receiving terminals are interposed between the plurality of personal computers and the plurality of printers, and data which are to be sent from the personal computers to the printers are transmitted by wireless communication. The terminals are assigned addresses, respectively. In accordance with the address, identification of the terminal from which data are transmitted, and that of the terminal which receives the data are displayed. Since the receiving terminal always receives data transmitted from one transmitting terminal, the concurrent reception of data is not conducted.

As shown above, the wireless printer and the printer buffer are configured without consideration of the concurrent reception of data, and therefore, when data are received simultaneously by using them, packets are erroneously mixed with each other.

Usually, a HOST edits a series of print data and then sends the edited print data, and therefore, the total amount of print data can be calculated before the transmission of the print data is started. However, since a terminal printer is not provided with a function of reserving a reception buffer memory, there arises a problem in that a buffer full condition may be recognized after sequential transmission is executed. This problem causes a network to be wasted, thereby lowering the efficiency of the network.

At a timing when a terminal printer returns a positive acknowledge after normally receiving packets, the operation of a HOST is transferred to the next processing under the assumption that the printing is normally ended. Actually, however, there are cases such as print sheets are exhausted while the terminal printer executes the printing, and the printout is disabled because of a breakdown of a print mechanism. In such cases, the printout is not conducted until the operator of the HOST is aware of the situation, or the print data cannot be outputted until the printer is repaired. In the worst case, the print data may be lost.

Since simultaneous reception of print data from the plurality of HOSTs is not allowed conventionally, even when the printout processing is started from the top portion of the reception buffer in the unit of a packet, there arises no problem. When a terminal printer which is configured so that simultaneous reception of print data from the plurality of HOSTs is allowed, the following problem is occurred. When, before reception of a series of print data consisting of one or more packets is completed, the printing of a packet received from the next HOST is started, the arrival of the print data may be delayed because of low throughput of the HOSTs or transient increase of traffic in the network, with the result that the printout for another HOST must wait.

When a terminal printer is used as a kitchen printer or the like, there arises a problem in that the printout cannot be conducted in the sequence of orders.

SUMMARY OF THE INVENTION

It is an object of the invention to provide structure for, during a period when a host device or a task transmits print data, enabling print transmission of another host device or another task to be received, and judging whether or not a reception buffer which can store a series of print data can be reserved at a start point of transmission, and to provide a terminal printer in which inefficient use of a network is reduced, opportunities when print output is caused to be lost by a breakdown are reduced, a host device is notified of a case where printing is disabled, and a series of print outputs are conducted in the reception sequence.

In a first aspect of the invention, a terminal printer connected to a plurality of host devices via an interface configured by a single line, which receives transmission data from the respective host devices in a form of one or more packets, the transmission data containing print data to be printed and station numbers for identifying the respective host devices, and which prints the print data in the received transmission data by a print mechanism, the terminal printer comprising:

one reception buffer memory in which a plurality of allocation regions are provided in a data region on the basis of a number of the host devices; and a buffer management memory which stores the station numbers of the host devices and the allocation regions of the reception buffer memory in correspondence with each other, wherein each time when a packet is received, a station number of a host device in the packet is compared with the station numbers of the host devices stored in the buffer management memory to store the packet in an allocation region which is stored in correspondence with a coincident station number.

According to the first aspect of the invention, the reception buffer memory is divided on the basis of the number information which is preset in the buffer management memory of the terminal printer and which indicates the number of the host devices connected to the interface. Therefore, each of the allocation regions is used as a reception buffer for storing a packet from the host device of the corresponding station number.

According to this configuration, uniform reception buffers can be offered to all the host devices. Therefore, when the terminal printer is enabled to simultaneously receive print data from the plurality of host devices, the waiting time of each host device can be shortened and the throughput of a system configured by all the host devices, the interface, and the terminal printer can be improved.

In a second aspect of the invention, the terminal printer further comprises:

capacity information storing structure for storing information indicating capacities of the respective allocation regions which are allocated in the reception buffer memory in correspondence with the station numbers; and capacity changing structure for, when a capacity of the allocation region becomes insufficient in a course of reception of transmission data, changing information indicating the capacity of the allocation region, wherein capacities of the allocation regions of the reception buffer memory which are allocated to the host devices can be changed on the basis of the information stored in the capacity information storing structure.

According to the second aspect of the invention, in the terminal printer, when the number of the host devices connected to the interface, which is preset in the buffer management memory of the terminal printer, is larger with respect to the total capacity of the reception buffer memory, the capacity of the region allocated to each of the host devices is inevitably reduced. However, since it does not always follow that the connected host devices transmit print data at the same timing, there may be a case where the reception buffer memory is not effectively used. Then, the provision of the capacity information storing and the capacity changing enable that the total capacity of the reception buffer memory is effectively allocated to the allocation regions of the host devices. According to this configuration, it is not required to set the size of the reception buffer allocated to one host device to be the logical maximum value, and hence the capacity of the reception buffer memory which is finite can be effectively used.

In a third aspect of the invention, a top packet which is first transmitted in transmission of data from the host device has reception buffer allocation control information for designating whether or not a capacity required for storing all the transmission data is to be reserved in an allocation region corresponding to a station number of the host device, and information indicating a total capacity of the transmission data; and when reservation of the capacity of the allocation region is designated by the reception buffer allocation control information, the capacity information of the allocation region which is stored in the capacity information storing structure is changed by the capacity changing structure on the basis of the information indicating the total capacity of the transmission data before reception of a packet subsequent to the top packet is started.

According to the third aspect of the invention, since the host devices previously calculate the total capacity of transmission data and notify the terminal printer of the total capacity, it is possible to eliminate a waste wherein a buffer full condition is detected after start of reception of transmission data and transmission is then interrupted. When the amount of transmission data is previously calculated in each of the host devices, restriction of the output process is imposed on the printout control of the host devices, and in a host device in which the memory capacity is not sufficiently reserved, this causes a large load. In view of the above, in the terminal printer, the amount of transmission data is previously calculated on the basis of the reception buffer allocation control information, and the host device can select according to the capability of the host device whether the designation is to be conducted or not.

In a fourth aspect of the invention, the terminal printer further comprises:

a printer management memory for storing a station number of a terminal printer for emergency output in correspondence with the station numbers of the host devices connected to the interface;

breakdown detecting structure for detecting a breakdown of the print mechanism; and transfer printing structure for, when the breakdown detecting structure detects a breakdown of the print mechanism, transferring print data in a print-disabled state to the corresponding terminal printer for emergency output in accordance with the station number of the terminal printer for emergency output which is stored in the printer management memory, thereby allowing the print data to be printed.

According to the fourth aspect of the invention, in the terminal printer, since print data are transferred to the terminal printer for emergency output when a breakdown of the terminal printer is detected, the printout can be executed by another terminal printer before the breakdown is repaired. Moreover, even when a breakdown occurs in the terminal printer, print information can be rapidly output, so that the processing load of each host device and the preparation of control programs can be reduced or simplified. When print data which have been transferred are to be erased from the reception buffer memory, it is possible to avoid duplicated output of the transferred print data after recovery of the breakdown. The terminal printers of the second and third inventions may also comprise the printer management memory, the breakdown detecting structure, and the transfer printing structure. Also in these cases, the same effects as those described above can be attained.

In a fifth aspect of the invention, the terminal printer further comprises notifying structure for, when the station number of the terminal printer for emergency output is not set in the printer management memory or print data cannot be transferred to the terminal printer for emergency output when the breakdown detecting structure detects a breakdown of the print mechanism, notifying the host device which has transmitted transmission data including the print data in the print-disabled state, that printing has not been conducted.

According to the fifth aspect of the invention, when emergency output is disabled, the terminal printer gives notification indicative of this to the host device, and hence it is expected to conduct processing appropriately for each system. In the case where print data can be reproduced, for example, the print data are reproduced in the host device, and the print data can be then output from a local printer connected to the host device. In the case where data necessary for generating the print data are already erased from the host device, the print data are uploaded from the terminal printer so that the print data can be outputted from a local printer of the host device.

In a sixth aspect of the invention, the terminal printer further comprises notifying structure for, when the print mechanism fails to continue printing of print data after transmission data from one of the a plurality of host devices are received, notifying the one host device that the print data cannot be printed.

According to the sixth aspect of the invention, when printing cannot be continued after reception of transmission data, the terminal printer notifies the host device of this, and therefore, in the same manner as the terminal printer of the fifth aspect, it is expected to conduct processing appropriately for each system. The terminal printers of the second and third aspects may also comprise the notifying structure. Also in these cases, the same effects as those described above can be attained.

In a seventh aspect of the invention, a packet of data transmitted from a host device contains an identification number of an application function of the host device;

the terminal printer further comprises memory controlling structure for using the reception buffer memory in a divided manner on the basis of a station number of the host device included in the packet and the identification number; and a plurality of print data which are to be subjected to concurrent processing are simultaneously received from the same host device and respectively stored in divided regions of the reception buffer memory.

According to the seventh aspect of the invention, the terminal printer comprises the means for using the reception buffer memory in a divided manner on the basis of a CODE in which the station number of the host device is combined with the JOB number of the application function (application program) of the host device. In the terminal printer, a plurality of print data which are to be subjected to concurrent processing are simultaneously received from the same host device and respectively stored into different regions of the reception buffer memory. As a result, it is possible to provide a terminal printer in which print requests of different JOBs can be simultaneously received from the same host device and the multi-JOB function of a host device is not impeded. The packet transmission and the operation using the memory controlling structure may be also respectively applied to the terminal printers of the second to sixth aspect of the invention. Also in these cases, the same effects as those described above can be attained.

In an eighth aspect of the invention, the terminal printer further comprises:

a print state management memory for storing one from among a print completion state, a print waiting state, and a printing state in correspondence with each station numbers of a plurality of host devices connected to the interface;

state setting structure for setting the print waiting state in the print state management memory on the basis of a notification that transmission of a series of packets from the host devices is completed; and state management print controlling structure for causing a packet whose reception is completed in an allocation region, to be subjected to start of printing in precedence to a packet of an allocation region which is in the course of reception, on the basis of the print state which is stored in the print state management memory.

According to the eighth aspect of the invention, in the terminal printer, a host device is caused to notify that transmission of a series of packets is completed, and, in response to the notification of packet completion, a state in which reception of packets to be stored into each of the allocation regions is identified, and an allocation region in which a packet transmission has completed is subjected to start of printing in precedence to an allocation region in which a packet is in the course of reception. According to this configuration, it is possible to provide a terminal printer in which waiting for data transmission from a host device in the course of print output of the terminal printer is avoided, so that the throughput of the system is not lowered. The terminal printers of the second to seventh aspects may be also provided with the print state management memory, the state setting structure, and the state management print controlling structure. Also in these cases, the same effects as those described above can be attained.

In a ninth aspect of the invention, the terminal printer further comprises:

a print sequence management memory for storing a print sequence that is set on the basis of data indicating that reception of a series of packets is completed; and sequence management print controlling structure for causing the print mechanism to conduct printing of each print data in accordance with the print sequence stored in the print sequence management memory.

According to the ninth aspect of the invention, a use of the terminal printer as a kitchen printer will be considered, for example. In principle, processing is conducted in the sequence of orders although the sequence may be slightly changed in accordance with the working procedure in a kitchen. The terminal printer comprises structure for judging the sequence of times when reception of packets is completed, on the basis of data indicating completion of reception of packets, and setting the print sequence on the basis of the result of the judgment, so that a packet of an older reception completion time Is subjected to start of printing in precedence to a packet of a newer reception completion time. As a result, it is possible to provide a terminal printer in which the sequence of print outputs can be roughly ensured.

BRIEF DESCRIPTION OF THE DRAWINGS

Other objects, features, and advantages of the invention will be more explicit from the following detailed description taken with reference to the drawings wherein:

FIG. 5 is a diagram showing a memory map of a buffer management memory which is used in a buffer allocation system of a second embodiment of the invention;

FIG. 6 is a view showing the configuration of a reception buffer size table (memory map) which is used in the buffer allocation system of the second embodiment of the invention;

FIG. 14 is a view showing the configuration of a reception buffer/print control table (memory map) in the fourth embodiment of the invention;

DETAILED DESCRIPTION OF THE PREFERRED EMBODIMENTS

Figures 1, 2:
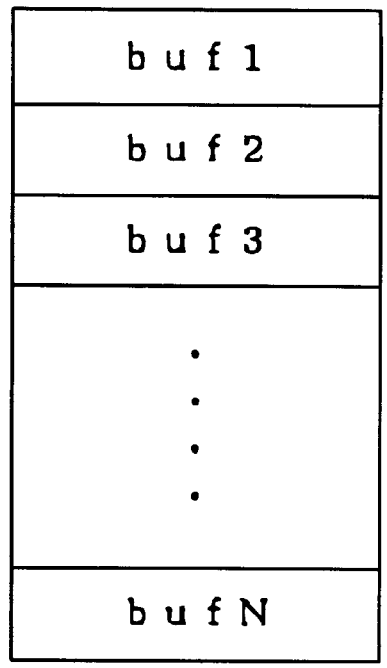
FIG. 1 is a view showing the configuration of a reception buffer memory of a first embodiment of the invention.
FIG. 2 is a view showing the configuration of a reception buffer allocation table of the first embodiment of the invention and used for determining a region of a reception buffer into which data of a received packet are to be stored.

Now referring to the drawings, preferred embodiments of the invention are described below.

Figure 3:
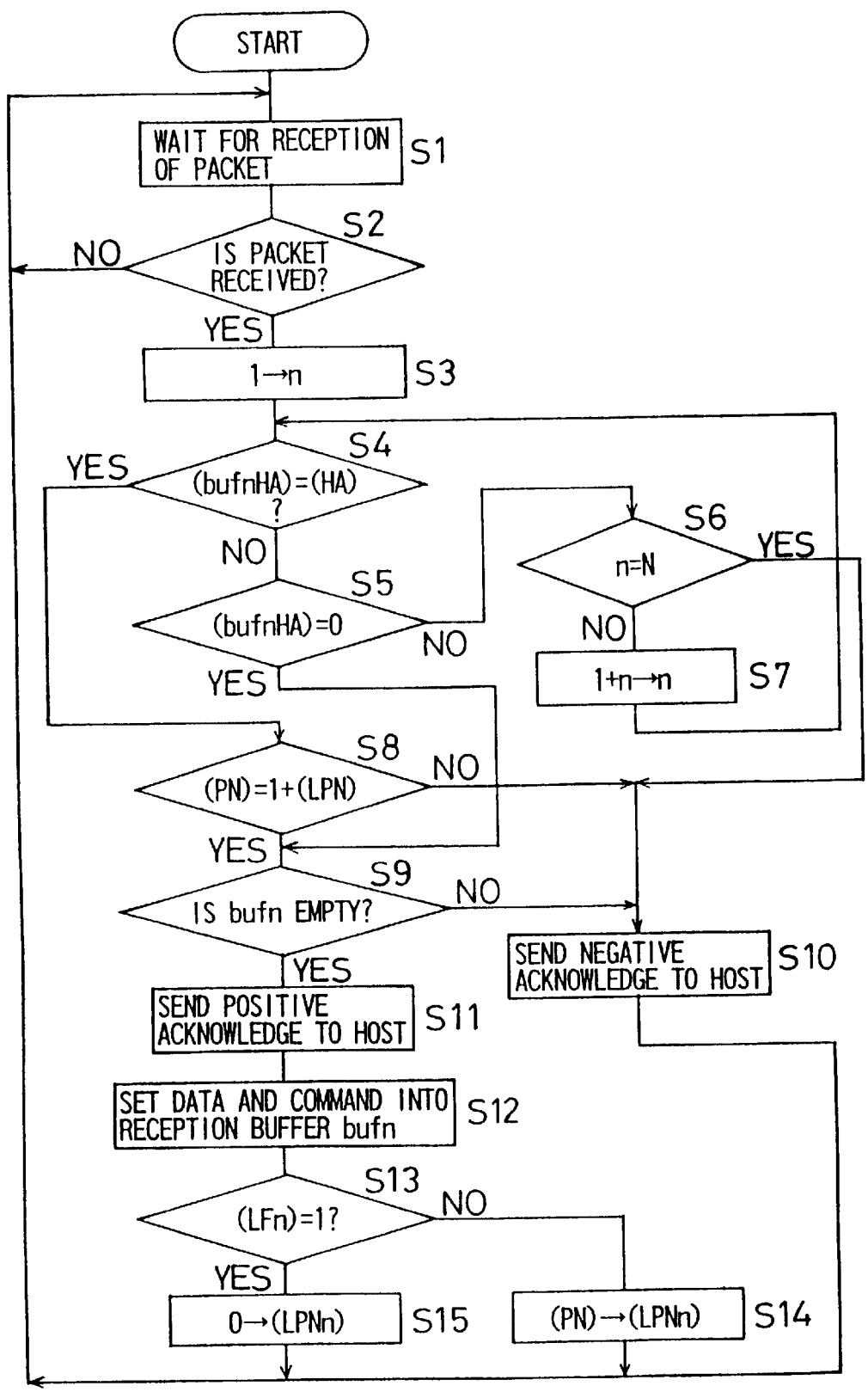
FIG. 3 is a flowchart of a control of the reception buffer memory having the structure shown in FIG. 1.
Figure 22:
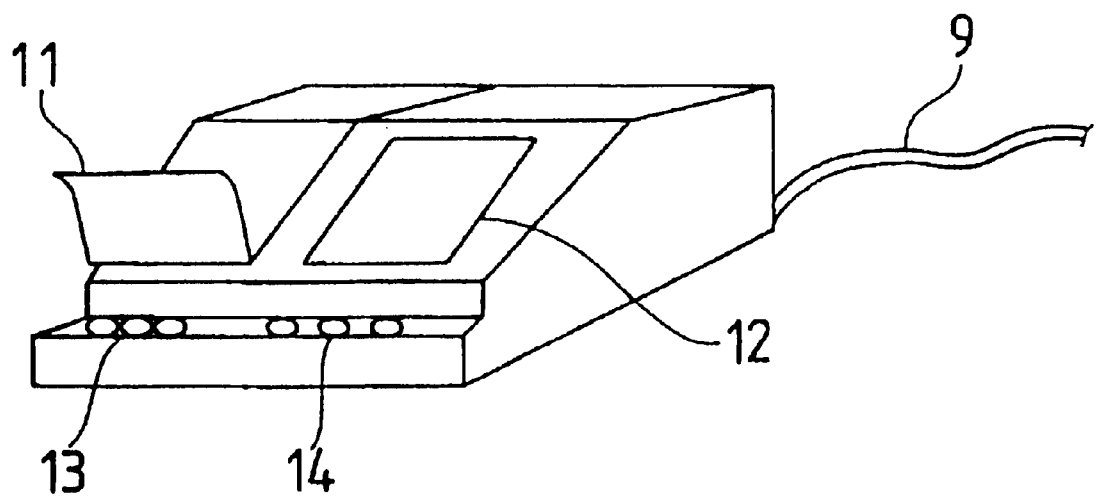
FIG. 22 is an external view of a terminal printer.
Figure 23:
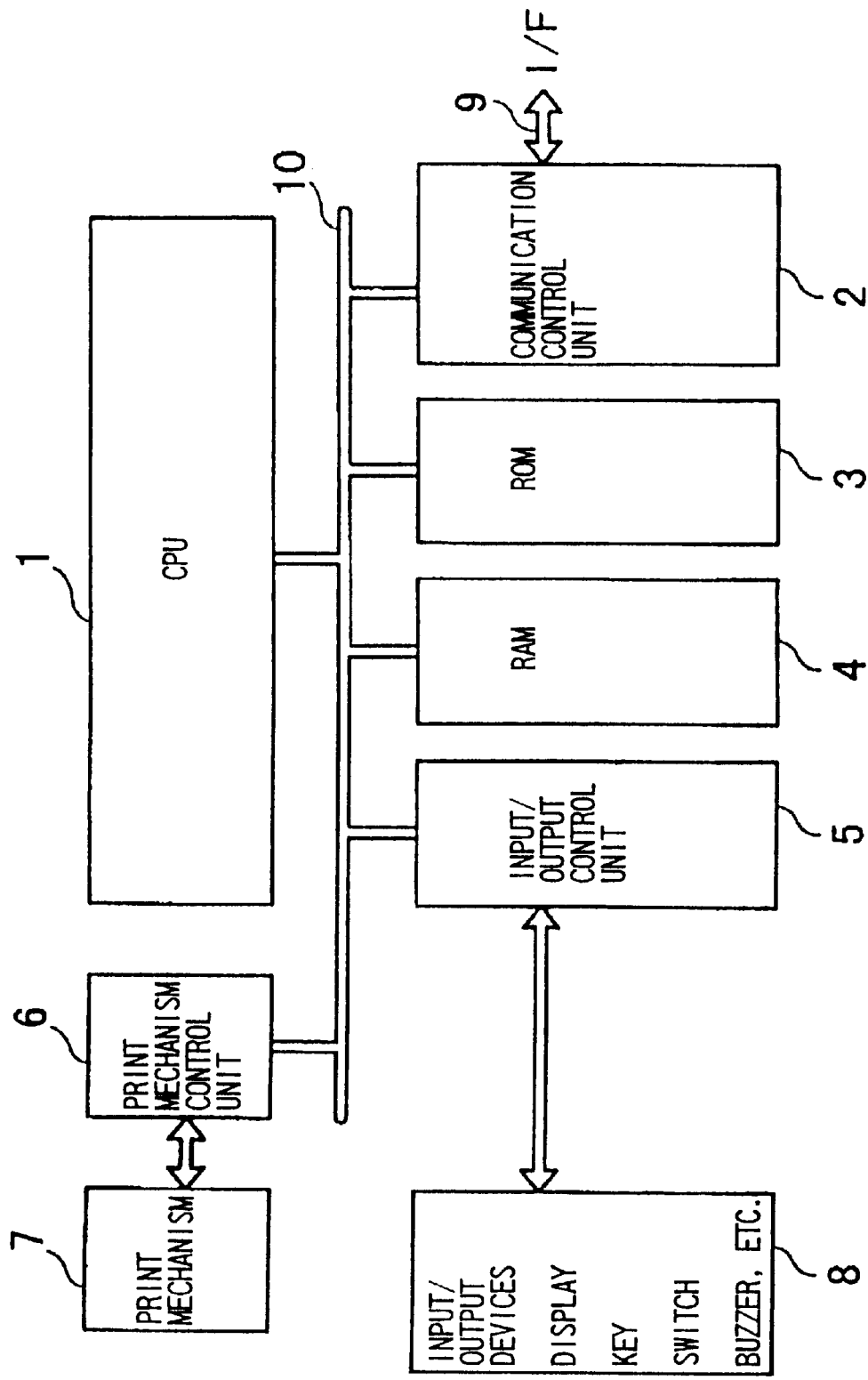
FIG. 23 is a block diagram showing the electrical configuration of the terminal printer.
Figure 24:
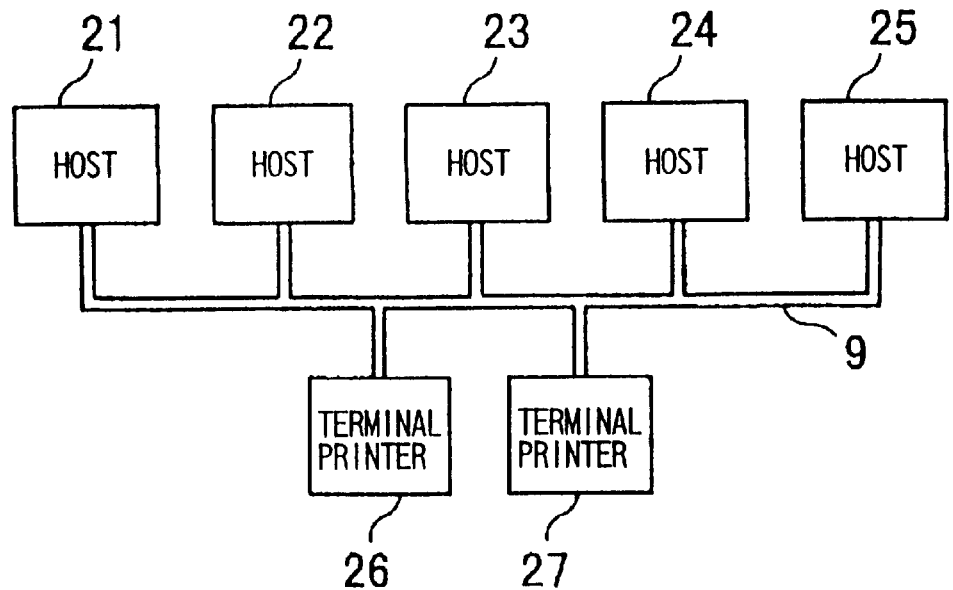
FIG. 24 is a block diagram showing a state in which the terminal printer is connected to host devices via an interface.
Figure 25:
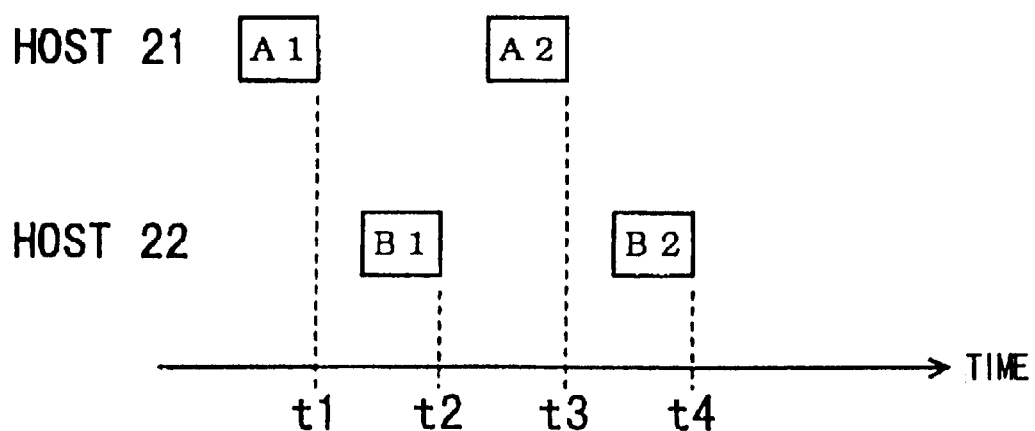
FIG. 25 is a diagram showing an example of a transmission timing chart of packets which produces a problem in the prior art.
Figure 26:
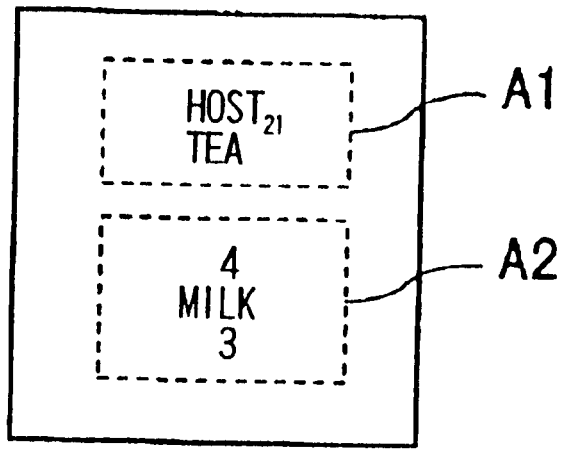
FIG. 26 is a view showing an example of comparison printing which is used for illustrating a mixture of packets which produces a problem in the prior art.
Figure 27:
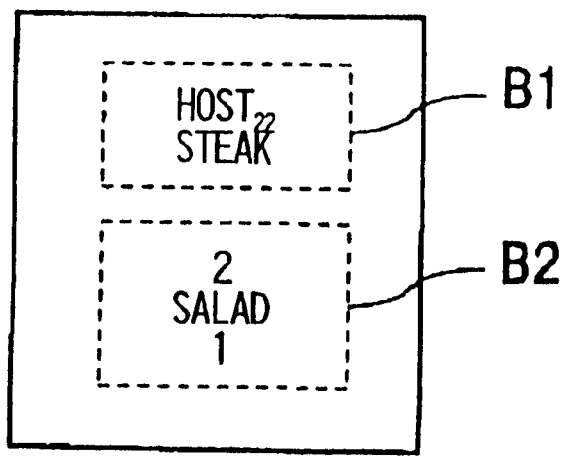
FIG. 27 is a view showing another example of comparison printing which is used for illustrating a mixture of packets which produces a problem in the prior art.
Figure 28:
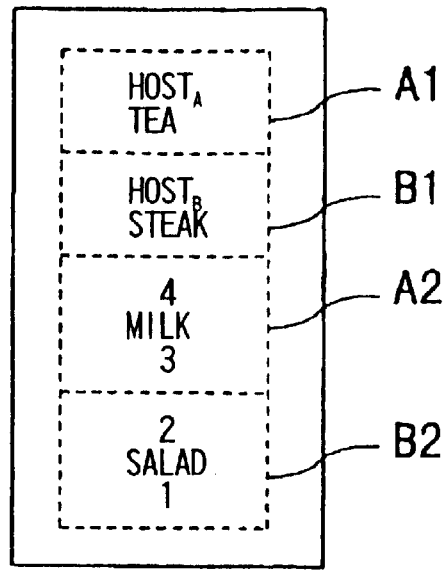
FIG. 28 is a view showing an example of mixture printing which is used for illustrating a mixture of packets which produces a problem in the prior art.

FIGS. 1 to 3 illustrate a terminal printer which is a first embodiment of the invention. The external view and basic electrical configuration of the terminal printer of the embodiment are identical with those shown in FIGS. 22 and 23. The structure of the system comprising the terminal printer, an interface configured by a single line, and the plurality of host devices (HOSTs) are identical with that shown in FIG. 24. Therefore, detailed description of the appearance and basic electrical configuration of the terminal printer, and the structure of the system is omitted. In the following, description will be made by using the reference numerals used in FIGS. 22 to 24 as required.

FIG. 1 shows an example of the configuration of a reception buffer memory. Specifically, FIG. 1 shows allocation regions in which a storage region to be used as a reception buffer memory in the RAM 4 is divided on the basis of HOST terminal number information indicative of the number of the HOSTs that is previously defined by setting the switches of an input/output device 8. The divided regions are allocated to the HOSTs. Each allocation region is used as a reception buffer that stores only packets transmitted from the HOST to which the region is allocated and that does not store packets from another HOST. Hereinafter, these allocation regions are referred to as reception buffers buf1 to bufN where N is an arbitrary integer and is not smaller than, for example, the number of the HOSTs. In the following description, "1" to "N" of reference numerals are suffixes. When such a suffix is an arbitrary number which is not smaller than 1 and not larger than N, the suffix is indicated by m.

In the example, the HOST terminal number information is set by means of the switches. Alternatively, number information which is previously stored in the ROM 3 may be used. A method may be employed in which the HOST terminal number information is set from a HOST by using a terminal printer control command for setting the information.

Figure 29:
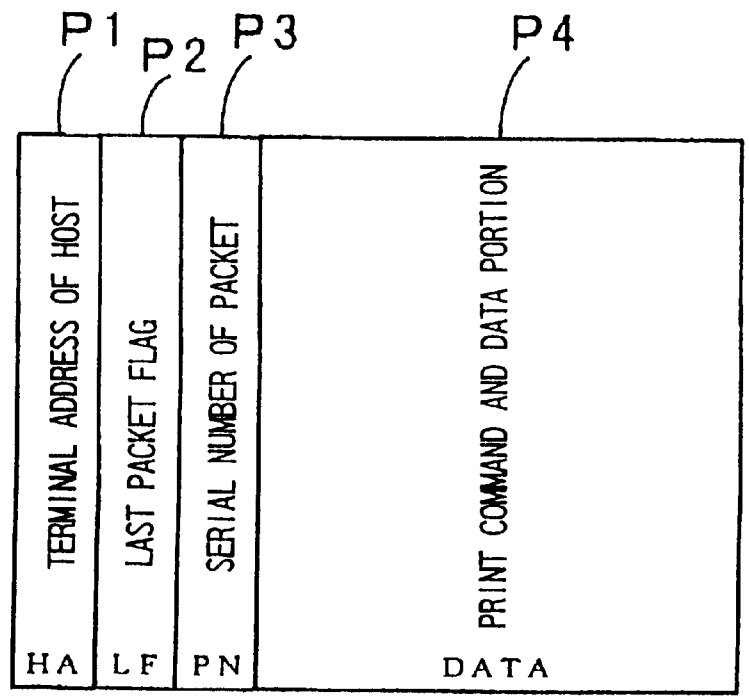
FIG. 29 is a view showing the configuration of a packet which is required in a control in the prior art terminal printer.
Figure 30:
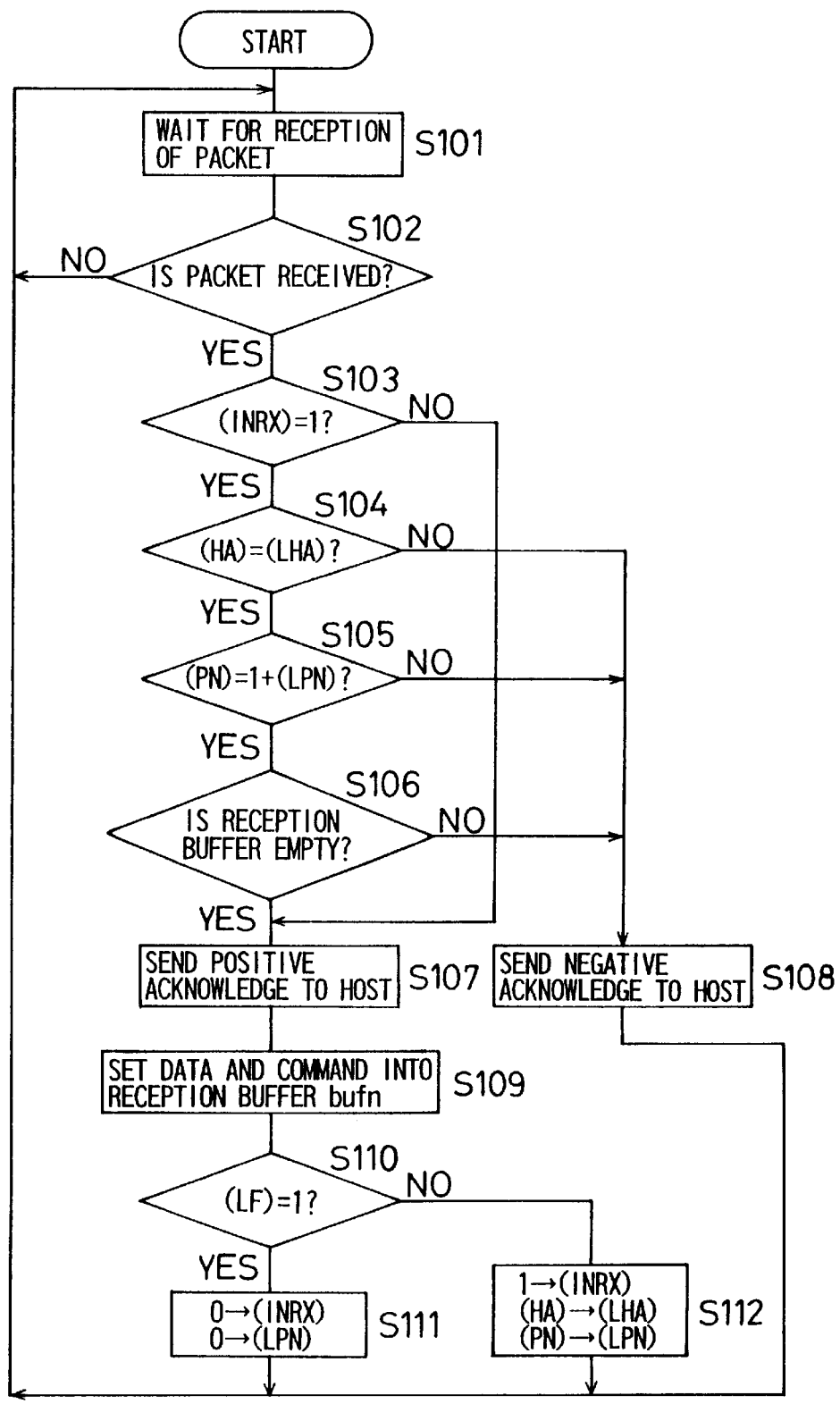
FIG. 30 is a flowchart showing print data reception in the prior art terminal printer having the packet configuration shown in FIG. 29.

Packets which are used in the control of the terminal printer of the first embodiment are configured in the same manner as those shown in FIG. 29. In the following, therefore, description will be made by using the reference numerals used in FIG. 29 as required.

FIG. 2 is a diagram showing a map which is used for deciding an allocation region of the reception buffer memory into which data of a received packet are to be stored. The map of FIG. 2 shows a specific region which is disposed in a part of the storage region of the RAM 4 and which is configured by regions the number of which is two times that of regions of the reception buffer memory. One of the regions, i.e., buf1HA stores a terminal address HA (P1 of FIG. 29) of a HOST which uses the reception buffer buf1 of FIG. 1. Similarly, a region buf2HA stores a terminal address HA of a HOST which uses the reception buffer buf2 of FIG. 1, a region buf3HA stores a terminal address HA of a HOST which uses the reception buffer buf3 of FIG. 1, . . . , and a region bufNHA stores a terminal address HA of a HOST which uses the reception buffer bufN of FIG. 1. Regions LPN1 to LPNN storing the serial number of the packet which is lastly received are disposed so as to respectively correspond to the regions buf1HA to bufNHA. A region LPNm stores the serial number of the packet which is lastly received by the terminal printer, among packets transmitted from the HOST to which the terminal address stored in the corresponding region bufmHA is allocated.

A reception buffer bufm, a region bufmHA, and a region LPNm which have the same suffix correspond to each other.

The regions LPNm and bufmHA may be disposed by reserving a fixed bias number at continuous addresses. Alternatively, the regions may be disposed at arbitrary addresses and a pointer table may be separately prepared. In other words, any structure may be useful as far as the correspondence relationship of the regions LPNm and bufmHA with respect to the reception buffer bufm is uniquely determined.

FIG. 3 is a flowchart of a control of the thus configured reception buffer memory. The flowchart illustrates the reception operation in which the reception buffer is allocated by using the reception buffer memory (FIG. 1) and the map (FIG. 2) and print data are simultaneously received from the plurality of HOSTS. Hereinafter, the operation will be described with reference to the flowchart.

It is assumed that the stored contents of the regions buf1HA to bufNHA and the regions LPN1 to LPNn are initialized to be 0. Under this state, the operation waits for reception of a packet (step S1). In step S2, it is judged whether the reception of a packet is completed or not. When at least reception of the HA in a packet is not completed, the operation returns to step S1 to continue waiting for completion of reception.

When it is detected in step S2 that the reception of a packet is completed, the operation proceeds to step S3 in which a local argument n is initialized to be 1 in order to search an unused reception buffer. Thereafter, the operation proceeds to step S4.

In step S4, it is judged whether or not the value of a region bufnHA among the regions buf1HA to bufNHA which is designated by the local argument n coincides with the terminal address HA of the HOST in the packet. When the value of the region bufnHA coincides with that of the HA, it is assumed that the reception buffer bufn is allocated to the HOST received in step S1 and the packet is currently received or the reception buffer bufn is currently used for receiving a packet from the HOST which is presently received. Thereafter, the operation proceeds to step S8. By contrast, when it is judged in step S4 that the value of the region bufnHA does not coincide with that of the terminal address HA, the operation proceeds to step S5 and it is judged whether the region bufnHA is 0 or not.

When it is judged in step S5 that the region bufnHA is 0, it is assumed that the reception buffer bufn is not used or the buffer buf n is not allocated to any HOST, and the operation then proceeds to step S9. By contrast, when it is judged in step S5 that the region bufnHA is not 0, the operation proceeds to step S6.

In step S6, it is judged whether the use states of all the reception buffers have been tested or not. When the test of the use states of the reception buffers is not completed, the operation proceeds to step S7 in which the local argument n is incremented by 1 in order to test the use state of the next reception buffer. Thereafter, the operation returns to step S4 to repeat the test. By contrast, when it is judged in step S6 that the use states of all the reception buffers have been tested, it is assumed that the reception buffer of the packet received in step S1 cannot be reserved, and the operation proceeds to step S10 to transmit to the HOST a negative acknowledge packet indicating that the packet has not been normally received.

In step S8, it is checked whether the received serial numbers of the packets are continuous or not. When the serial number (PN) is not larger than the previous serial number (PN) by 1, the operation proceeds to step S10 to transmit to the HOST the negative acknowledge packet indicating that the packet has not been normally received. By contrast, when the serial number (PN) is larger than the serial number (PN) of the previous received packet by 1, it is assumed that the packet reception sequence is normally maintained, and the operation proceeds to step S9.

In step S9, it is checked whether or not the empty area of the reception buffer bufn is sufficient for storing the data packet which is received at this time. When the data can be stored, the operation proceeds to step S11 in which a positive acknowledge packet is sent to the HOST, and then to step S12. The data of the received packet are stored into the corresponding reception buffer bufn. Thereafter, it is judged in step S13 whether the received packet is the last packet or not. By contrast, when it is detected in step S9 that the data of the received packet cannot be stored into the reception buffer bufn, the operation proceeds to step S10 to transmit to the HOST the negative acknowledge packet indicating that the data of the received packet cannot be stored.

In step S13, it is judged whether the LF of the received packet is 1 or not. When the packet is not the last packet, the operation proceeds to step S14 to copy the packet serial number to the region LPNn. By contrast, when it is judged in step S13 that the packet is the last packet, the operation proceeds to step S15 in which 0 is copied in order to initialize the region LPNn.

As a result of the above-described operation, even when a packet is received from a HOST during a period when a series of data are received from another HOST, the reception of the data of the packet is enabled and the packets transmitted from the respective HOSTs can be separately stored into different reception buffers which are respectively allocated to the HOSTs.

Figure 4:
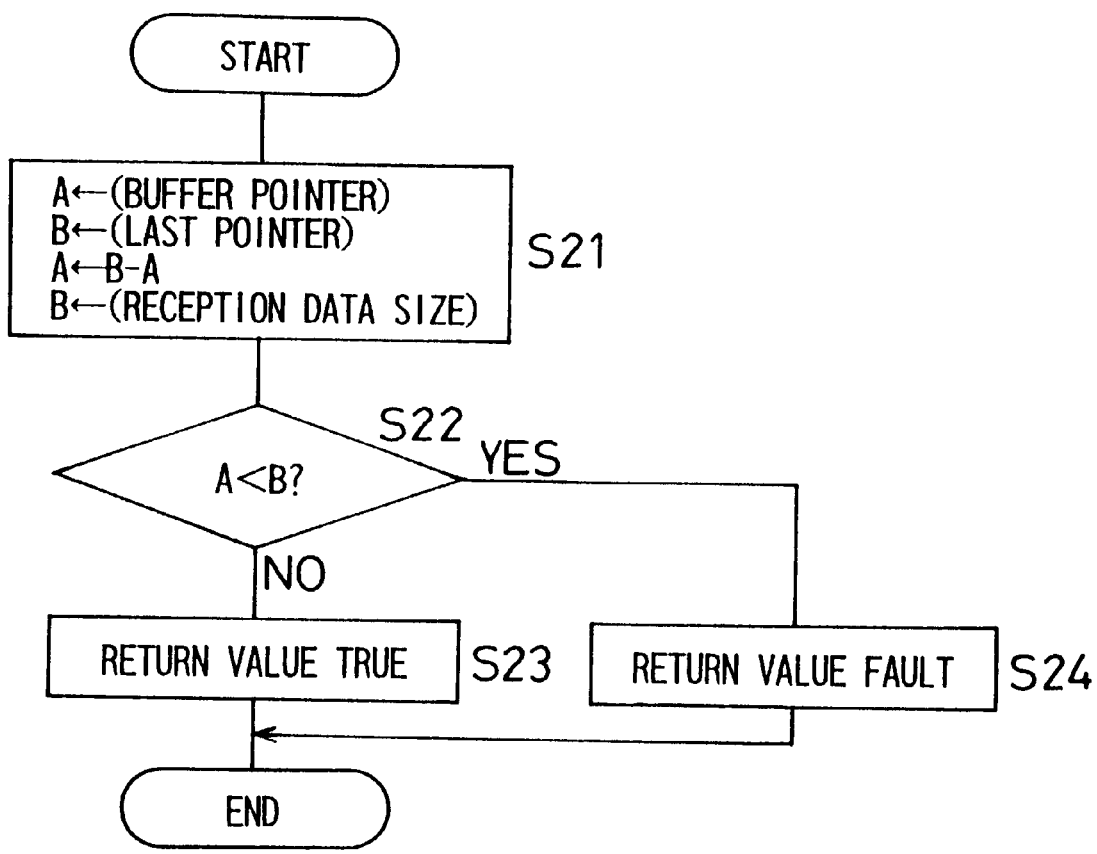
FIG. 4 is a flowchart for judging a remaining capacity of a reception buffer.

FIG. 4 is a flowchart for judging a remaining capacity of a reception buffer. Namely, the figure shows an example of the judgment in step S9 of FIG. 3 on whether the allocated reception buffer has an empty space or not.

In step S21, the difference between a buffer pointer indicating the current storage location of the reception buffer and a last pointer indicating the end of the reception buffer, i.e., the remaining capacity of the reception buffer is stored into a register A, and the reception data size indicating the data amount of the packet which is received at this time is stored into a register B. Thereafter, the operation proceeds to step S22. In step S22, the remaining capacity of the reception buffer is compared with the reception data size. When the remaining capacity is greater than the reception data size, the operation proceeds to step S23 to return a value TRUE. When the remaining capacity is smaller than the reception data size, the operation proceeds to step S24 to return a value FAULT.

As seen also from this example, when an allocated reception buffer is fixed, it is not ensured that reception data can be always stored into the reception buffer. Even when a connected HOST does not have the print request, moreover, a reception buffer cannot be used for the reception of data from another HOST, thereby producing a disadvantage that the utilization efficiency of the RAM 4 which is used as a reception buffer is low.

To comply with this, a terminal printer of a second embodiment is configured so that the utilization efficiency of the RAM 4 is enhanced by using a buffer management memory.

FIGS. 5 to 8 illustrate the terminal printer of the second embodiment of the invention. The terminal printer of the second embodiment is the same as that of the first embodiment except the internal configuration of the RAM 4 and the operation in the packet reception. The components which are identical with those of the terminal printer of the first embodiment are designated by the same reference numerals and their detailed description is omitted. The terminal printer corresponds to the second aspect of the invention described in the paragraph of the summary of the invention.

In the RAM 4 of the terminal printer of the second embodiment, in place of the map of FIG. 2, a buffer management memory is prepared in addition to the reception buffer memory, and also a reception buffer size table of FIG. 6 is prepared. The buffer management memory and the reception buffer size table are used in a buffer allocation system for determining the manner of allocating the reception buffer memory to the reception buffers (allocation regions).

FIG. 5 shows the memory map of the buffer management memory which is used in the buffer allocation system. The buffer management memory is a specific region which is set in the RAM 4, and divided into regions the number of which is five times that of the reception buffers in the reception buffer memory. Among the regions, regions buf1HA to bufNHA are regions which respectively correspond to the reception buffers buf1 to bufN shown in FIG. 1 and which store the terminal addresses of HOSTs that use the reception buffers, respectively. Similarly, regions LPN1 to LPNN shown in FIG. 5 are regions which store serial numbers of packets that use the reception buffers buf1 to bufN, respectively.

In the buffer management memory, for each of the reception buffers buf1 to bufN, three regions corresponding to the reception buffer are reserved. Specifically, a region buf1SA shown in FIG. 5 stores the start address of the reception buffer buf1. Similarly, in correspondence with the reception buffers buf1 to bufN, regions buf1SA to bufNSA which store the start addresses of the respective reception buffers are reserved. A region buf1P stores a top pointer indicative of the top address of an empty region of the reception buffer buf1. In correspondence with the reception buffers buf1 to bufN, regions buf1P to bufNP which store the top pointers of the respective reception buffers are reserved. A region buf1EA stores the end address of the reception buffer buf1. In correspondence with the respective reception buffers buf1 to bufN, regions buf1EA to bufNEA which store the end addresses of the reception buffers are reserved.

FIG. 6 is a view (memory map) of the configuration of the reception buffer size table which is used in the buffer allocation system. The plurality of regions HA1 to HAM of FIG. 6 store terminal addresses of the HOSTs. In this example, the regions store HAs of an M number of HOSTs at the maximum, where M is an arbitrary natural number. In correspondence with the regions HA1 to HAM, regions siz1 to sizM which store the respective maximum reception buffer sizes are disposed.

Figure 7:
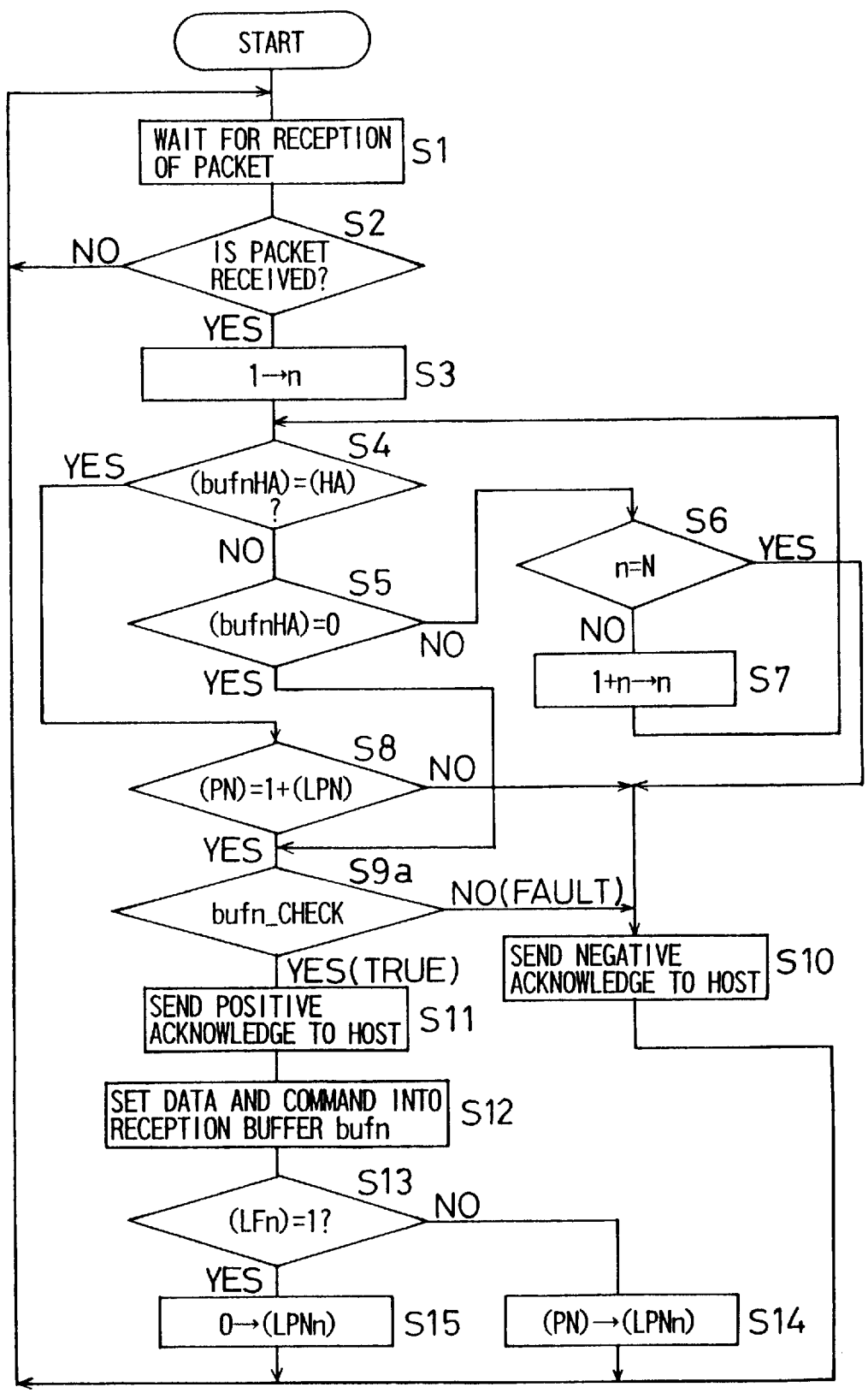
FIG. 7 is a flowchart showing the allocation of the reception buffers which uses the memory maps shown in FIGS. 5 and 6.

FIG. 7 is a flowchart showing the allocation of the reception buffers which use the memory maps shown in FIGS. 5 and 6. The flowchart of FIG. 7 is the same as that of FIG. 3 except step S9. Therefore, the steps identical with those of FIG. 3 are designated by the same step numerals and their description is omitted. The step which is replaced with step S9 of the flowchart of FIG. 3 is designated as step S9a.

In step S9a, a subroutine bufn_CHECK is executed in which the total capacity of the reception buffer memory is allocated to the reception buffers by using the buffer allocation system. When the value TRUE is returned as a result of the execution of the subroutine, the operation proceeds from step S9a to step S11, and, when FAULT is returned, the operation proceeds from step S9a to step S10.

Figure 8:
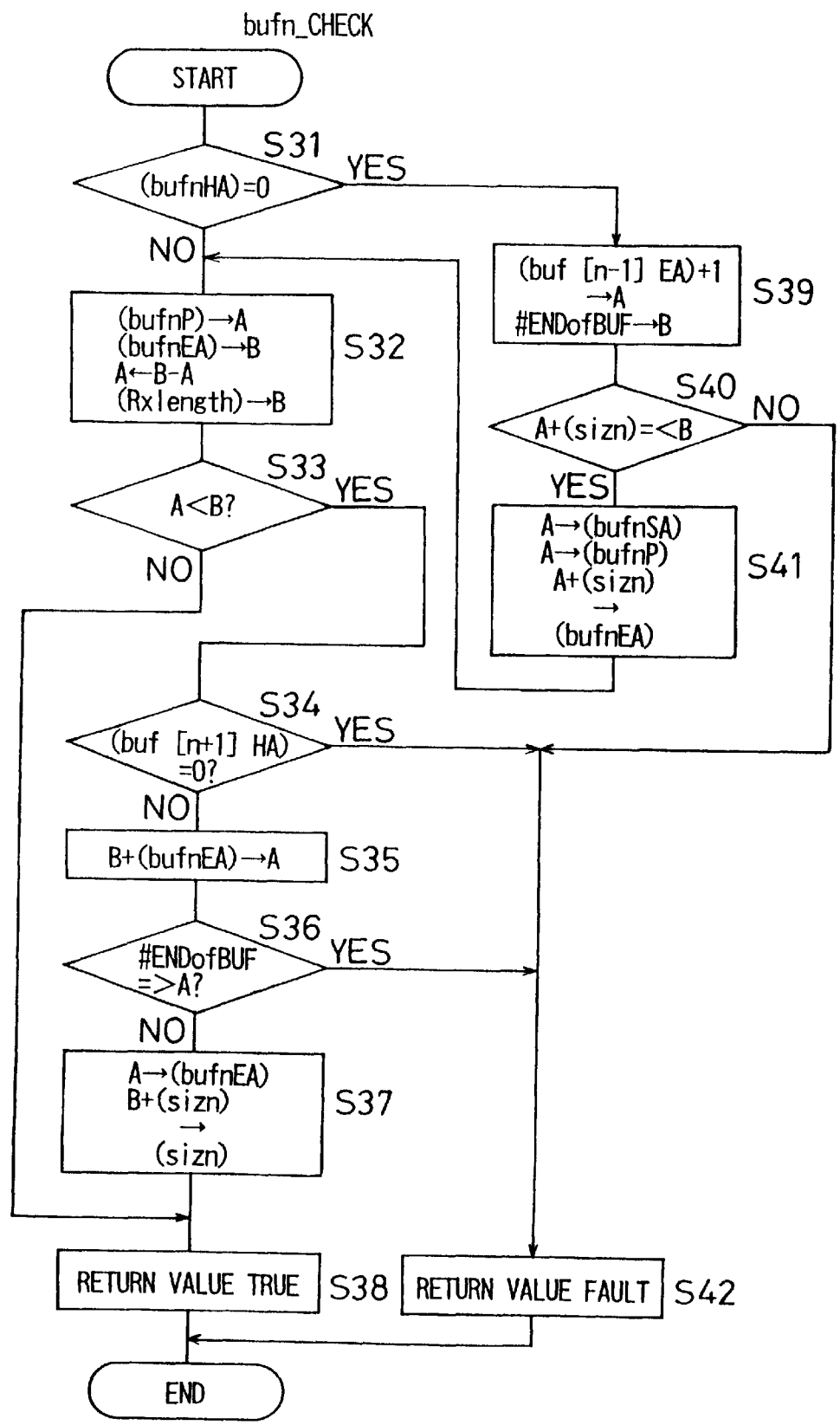
FIG. 8 is a flowchart of a subroutine bufn_CHECK which is called in step S9*a* of FIG. 7.

FIG. 8 is a flowchart of the subroutine bufn_CHECK which is called in step S9a of FIG. 7. It is assumed that, in FIG. 7, the regions HA1 to HAM are initialized to be 0. Furthermore, it is assumed that the regions siz1 to sizM store a value which is obtained by dividing the total capacity of the reception buffer memory by the number of the HOSTs, as the initial value.

In step S31, it is judged whether or not a reception buffer bufn, i.e., a reception buffer which is selected to store the currently received packet, is being used in the packet reception of any one of the HOSTs. When the reception buffer is not being used, the operation proceeds to step S32. The difference which is obtained by subtracting the end address (bufnEA) of the reception buffer bufn from the top pointer (bufnp) of the reception buffer bufn, i.e., the remaining capacity of the reception buffer bufn, is calculated. The calculated difference is stored into the register A. The data size (Rxlength) of the packet which is received at this time is stored into the register B. Thereafter, the operation proceeds to step S33.

In step S33, it is judged whether or not the remaining capacity of the reception buffer bufn is sufficient for storing the data of the packet which is received at this time. When the data can be stored, the operation proceeds to step S38 to return the value TRUE and the subroutine is then ended. By contrast, when it is judged in step S33 that the reception data cannot be stored into the reception buffer bufn, the operation proceeds to step S34 in which it is checked whether or not the next reception buffer buf(n+1) is currently used for the packet reception of any HOST.

When the check shows that the next reception buffer buf(n+1) is currently used, it is difficult to expand the buffer size and hence the operation proceeds to step S42 to return the value FAULT and the subroutine is then ended. When the check in step S34 shows that the next reception buffer buf(n+1) is not used, the operation proceeds to step S35. The end address in the case where the reception buffer bufn is expanded by the size of the data which are received at this time, i.e., the address which is obtained by adding the data size Rxlength to the end address stored in the region bufnEA is stored into the register A. Thereafter, the operation proceeds to step S36.

In step S36, it is judged whether or not the end address of the reception buffer bufn which is provisionally calculated in step S35 is greater than the total capacity #ENDofBUF of all the reception buffers. When the end address is not greater than the total capacity, the operation proceeds to step S37 in which the end address stored in the register A is stored into the region bufnEA and the data size Rxlength is added to the value stored in the region sizn to update the region. Thereafter, the operation proceeds to step S38 to return the value TRUE and the subroutine is then ended. By contrast, when it is judged in step S36 that the end address of the reception buffer bufn which is provisionally calculated in step S35 is greater than the total capacity #ENDofBUF of all the reception buffers, the operation proceeds to step S42 to return the value FAULT and the subroutine is then ended.

By contrast, when it is judged in step S31 that bufnHA=0, i.e., the reception buffer bufn is not used, the operation proceeds to step S39. A value which is obtained by adding 1 to the end address of the previous reception buffer buf(n-1) is stored as the start address of the reception buffer bufn which is used at this time, into the register A. The total capacity #ENDofBUF is stored into the register B and the operation then proceeds to step S40.

It is judged in step S40 whether or not the size of the data which are received at this time is greater than the total capacity #ENDofBUF. When the data is not greater than the total capacity, the operation proceeds to step S41. The value stored in the register A is stored into the regions bufnSA and bufnP as the start address of the reception buffer and the top pointer of the reception buffer. The sum of the values stored in the register A and the region sizn is set in the region bufnEA as the end address of the reception buffer. Thereafter, the operation proceeds to step S32. By contrast, when it is judged in step S40 that the size of the data which are received at this time is greater than the total capacity #ENDofBUF, the operation proceeds to step S42 to return the value FAULT and the subroutine is then ended.

As a result, when the remaining capacity of a reception buffer bufm is smaller than the data size of the received packet, it is possible to expand the reception buffer bufm. Therefore, the whole capacity of the reception buffer memory can be effectively assigned to reception buffers respectively allocated to the HOSTs from which packets are received simultaneously.

Figure 9:
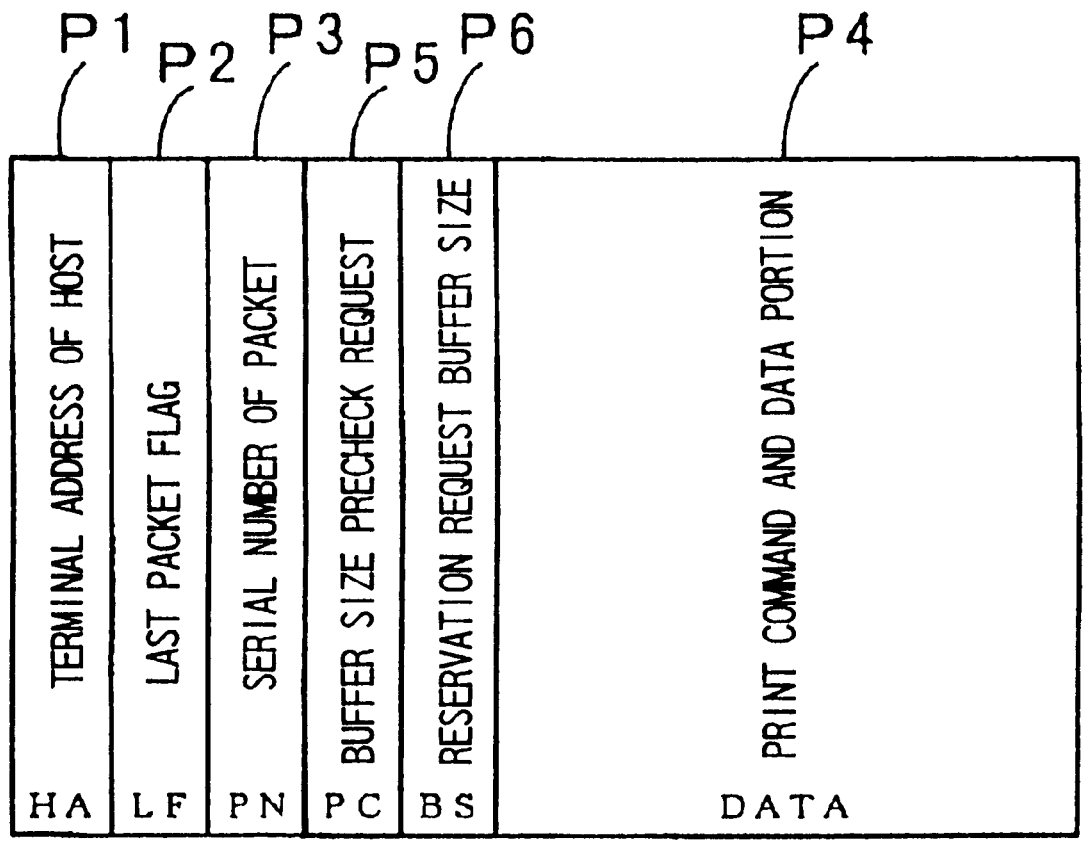
FIG. 9 is a view showing the configuration of a first packet which is used in a buffer allocation system of a third embodiment of the invention.
Figure 10:
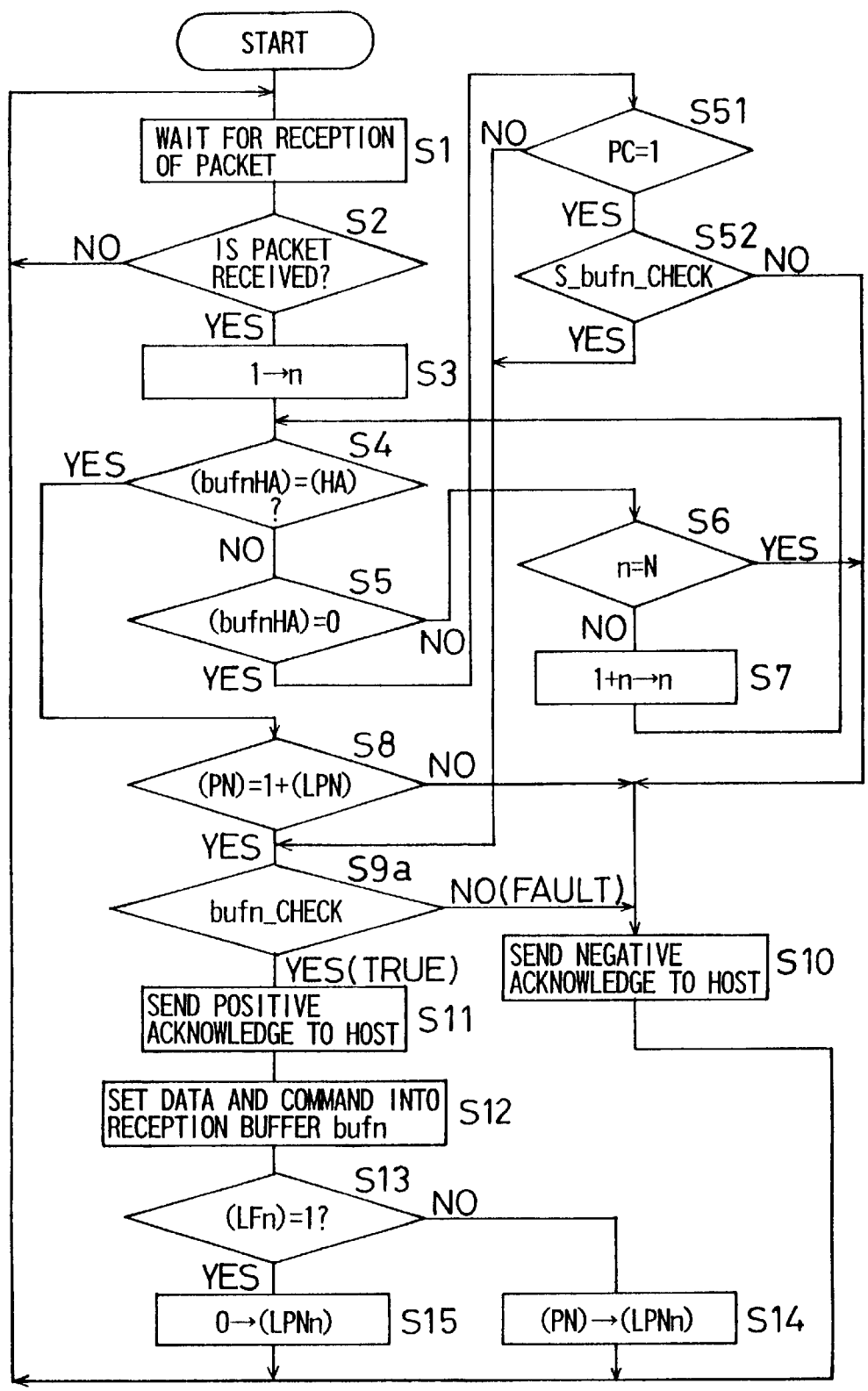
FIG. 10 is a flowchart showing a reception processing of the buffer allocation system in the case where the first packet shown in FIG. 9 is used.
Figure 11:
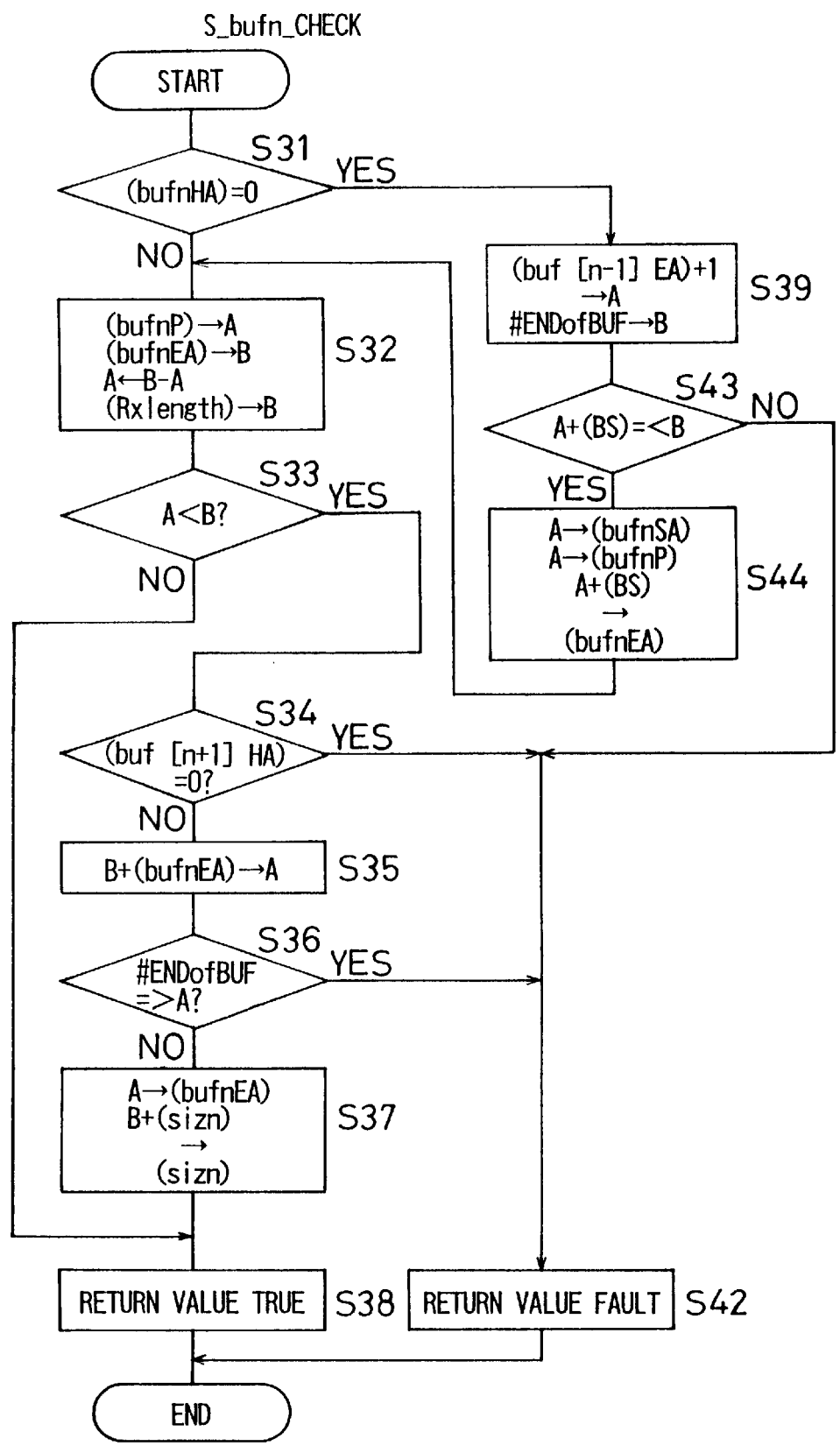
FIG. 11 is a flowchart of a subroutine S_bufn_CHECK which is called in step S52 of FIG. 10.

FIGS. 9 to 11 illustrate the terminal printer of a third embodiment of the invention. The terminal printer of the third embodiment is the same as that of the first embodiment except the internal configuration of the RAM 4 and the operation in the packet reception. The components which are identical with those of the terminal printer of the first embodiment are designated by the same reference numerals and abbreviations and their detailed description is omitted. The terminal printer corresponds to the third aspect of the invention described in the summary of the invention.

FIG. 9 shows an example of the configuration of a first packet which is used in the buffer allocation system. The first packet is configured by adding a field P5 which stores a buffer size precheck request (hereinafter, referred to as PC), and a field P6 which stores reservation request buffer size information (hereinafter, referred to as BS) to the configuration of the first packet shown in FIG. 29.

The PC information designates whether the precheck of reception buffer reservation, and reservation of a reception buffer are to be conducted or not, in accordance with the buffer size to be reserved, which is included in the BS in the reception of the first packet.

FIG. 10 is a flowchart showing a reception processing of the buffer allocation system in the case where the first packet shown in FIG. 9 is used. The flowchart of FIG. 10 is obtained by adding steps S51 and S52 to that of FIG. 7. Therefore, the steps identical with those of FIG. 7 are designated by the same step numerals and their description is omitted.

When it is judged in step S5 that 0 is stored in the region bufnHA, it is assumed that the reception buffer bufn is not used, and the operation proceeds to step S51.

In step S51, it is judged whether the buffer size precheck request PC in the first packet is 1 or not. When the buffer size precheck request PC is 1, the operation proceeds to step S52 to execute a subroutine S_bufn_CHECK which will be described later. By contrast, when it is judged in step S51 that the buffer size precheck request PC has a value other than 1 (for example, 0), the operation returns to step S9a and the processing identical with that described with reference to FIG. 7 is then executed.

FIG. 11 is a flowchart of the subroutine S_bufn_CHECK which is called in step S52 of FIG. 10. The flowchart of FIG. 11 is identical with that of the subroutine bufn_CHECK shown in FIG. 8 except steps S40 and S41. Therefore, the identical steps are designated by the same step numerals, and the steps which are replaced with steps S40 and S41 are designated by S43 and S44, respectively.

In step S43, in place of the judgment on whether the data size of the received packet can be stored into the reception buffer or not, a judgment on whether the buffer size to be reserved in BS of the first packet can be stored or not is conducted. In step S44, in place of reservation of the data size of the received packet, reservation of the size corresponding to the BS is conducted.

In step S43, therefore, it is judged whether or not the sum of the start address of the reception buffer bufn stored in the register A and the buffer size to be reserved in the reservation request buffer size information BS is greater than the total capacity #ENDofBUF of all the reception buffers. When the sum is greater than the total capacity, the operation proceeds from step S43 to step S42. When the sum is not greater than the total capacity, the operation proceeds from step S43 to step S44. In step S44, the sum is stored as the end address of the reception buffer. The start address of the reception buffer and the top pointer are stored in the same manner as step S41.

According to this configuration, in a HOST in which the total packet size can be previously calculated, the PC is set to be 1 prior to transmission of the first packet. As a result, in the stage of transmitting and receiving the first packet, it is possible to judge whether reservation of the reception buffer of the total packet size exists or not. For a HOST in which it is difficult to previously calculate the total packet capacity because of restrictions imposed on the memory capacity, the PC is set to be, for example, 0. This enables the terminal printer to be used in the range described in the second embodiment although the function of previously reserving the reception buffer of the total packet size cannot be provided.

FIGS. 12 to 15 illustrate the terminal printer of a fourth embodiment of the invention. The terminal printer of the fourth embodiment is the same as that of the first embodiment except the internal configuration of the RAM 4 and the operation in the packet reception. A printer other than the terminal printer is added as a terminal printer for emergency output to the system including the terminal printer, in such a manner that data can be transmitted between the printer and the terminal printer of this embodiment. The components which are identical with those of the terminal printer of the first embodiment are designated by the same reference numerals and their detailed description is omitted. The terminal printer corresponds to the fourth aspect of the invention described in the summary of the invention.

Figures 12, 13:
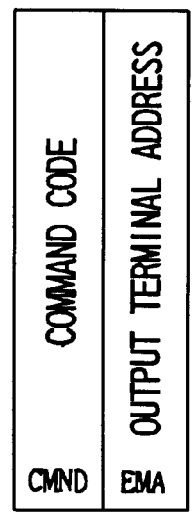
FIG. 12 is a view showing the configuration of a command in the case where a terminal address of a terminal printer for emergency output is set in a terminal printer of a fourth embodiment of the invention, in response to the command.
FIG. 13 is a view showing the configuration of a terminal address storage table (memory map) of the terminal printer for emergency output in the fourth embodiment of the invention.

FIG. 12 shows the configuration of a command in the case where a terminal address of a terminal printer for emergency output is set in the terminal printer in response to the command. In the example, the command is configured by a command code CMND for identifying the command as an emergency output command, and a terminal address EMA of the terminal printer for emergency output. The command is supplied from a HOST to the terminal printer.

FIG. 13 shows an example of a terminal address (hereinafter, referred to as EMA) storage table which, in the case where a command for setting the EMA of the terminal printer for emergency output is received, stores the EMA of the command for each HOST terminal address HA. The EMA storage table is configured by adding regions EMA1 to EMAM for storing the EMA to the memory map of the reception buffer memory table shown in FIG. 6.

Specifically, The regions EMA1 to EMAM are arranged so as to respectively correspond to addresses ranging from the region HA1 which stores the terminal address of the HOST using the reception buffer buf1 to the region HAM which stores the terminal address of the HOST using the reception buffer bufM.

It is assumed that the regions EMA1 to EMAM are initialized to be 0 prior to the start of the reception. When the command shown in FIG. 12 is received, the EMA is stored into one of the regions EMA1 to EMAM in accordance with the HA from which the command is transmitted.

FIG. 14 shows an example of the configuration of the memory map of a reception buffer/print control table. The example is configured by adding regions buf1CA to bufNCA which store print control information, to the memory map of the buffer management memory shown in FIG. 5. The regions buf1CA to bufNCA shown in FIG. 14 respectively correspond to the reception buffers buf1 to bufN and store information indicative of print state of the data stored in the reception buffers. In other words, the regions buf1CA to bufNCA store information such as the print data reception completion waiting state (value 0), the print waiting state (value 1), the printing state (value 2) and are mainly used for the print control. The other configuration is strictly identical with that shown in FIG. 5 and hence its description is omitted.

The print data reception completion waiting state is a state in which print data from a HOST are currently received and the last packet constituting the print data has not yet been stored into the reception buffer bufm. In this case, the value 0 is stored into the region bufmCA. The print waiting state is a state in which all packets constituting the print data are stored into the reception buffer bufm and the printing of the print data has not yet been started. In this case, the value 1 is stored into the region bufmCA. The printing state is a state in which the packet in the reception buffer bufm is used for printing. In this case, the value 2 is stored into the region bufmCA. The print data in the reception buffer in the print waiting state are called print waiting data.

Figure 15:
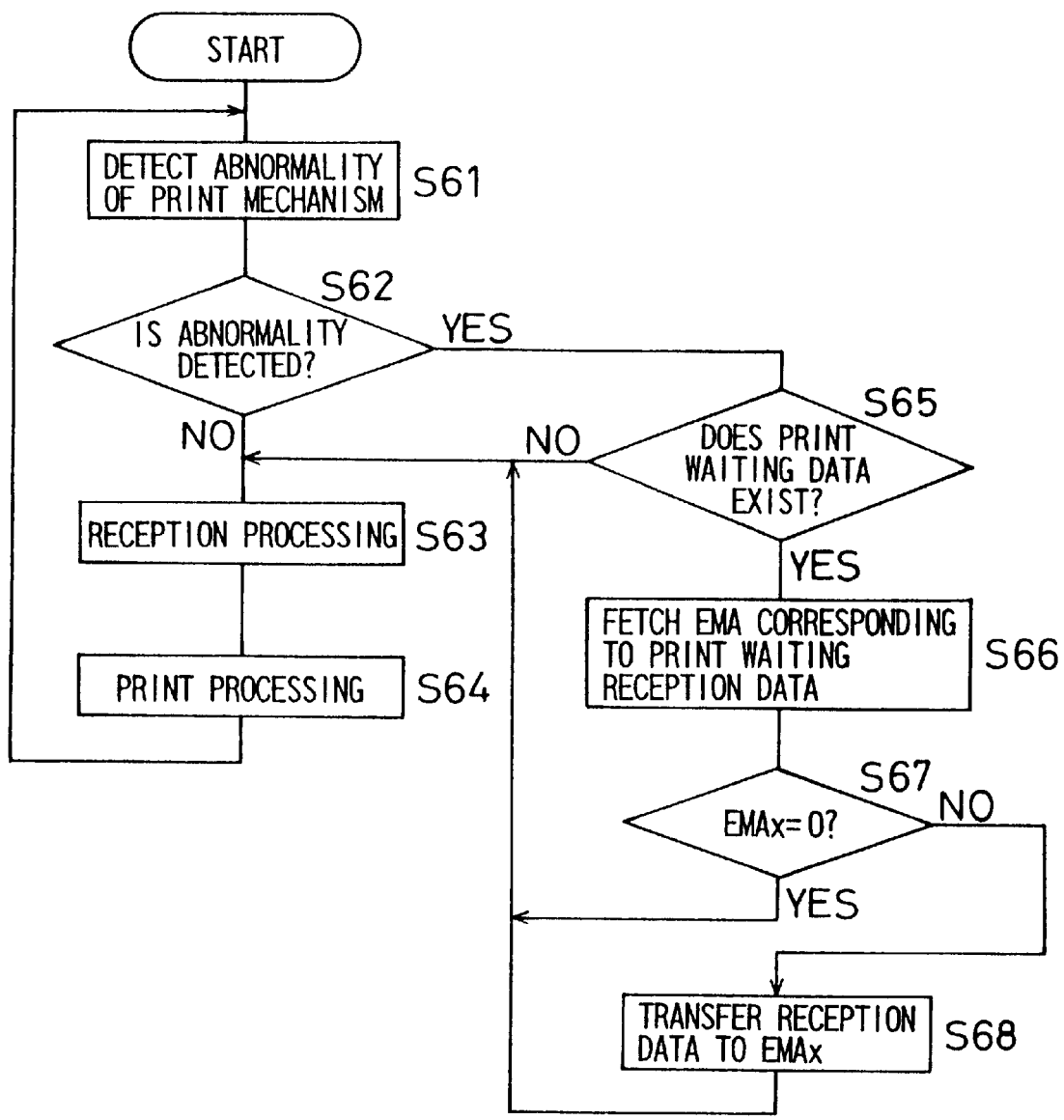
FIG. 15 is a flowchart showing an operation in the case where an abnormal state (breakdown) relating to a print mechanism is detected during a print wait process in the fourth embodiment of the invention.

FIG. 15 is a flowchart showing the whole control operation of the terminal printer including the detection of an abnormal state (breakdown) relating to the print mechanism while waiting for a print processing.

In step S61, the detection of an abnormal state (breakdown) of the print mechanism 7 is executed, and it is judged in step S62 whether an abnormal state occurs or not. When no abnormal state occurs, the operation proceeds to step S63 to conduct the reception processing of packets. Thereafter, the operation proceeds to step S64 to execute the print processing. In the reception processing, one of the processes of the flowcharts of FIGS. 3, 7, and 10 is used.

By contrast, when an abnormality is detected in step S62, the operation proceeds to step S65 to judge whether print waiting data exist or not. The existence of print waiting data can be judged in the following manner. The print control information of the reception buffer/print control table shown in FIG. 14 is detected by searching for information satisfying conditions that print control information of the regions buf1CA to bufNCA is 1 (print waiting) and the stored contents of the corresponding regions buf1HA to buhNHA are not 0 (currently used). In a reception buffer bunx (x is an arbitrary natural number) corresponding to information satisfying the conditions, print waiting data exist.

When it is judged in step S65 that print waiting data exist, the operation proceeds to step S66. The EMA stored in a region EMAx corresponding to the terminal address HA of the HOST transmitting the print waiting data, in the terminal address storage table of the terminal printer for emergency output and shown in FIG. 13 is read out. Thereafter, the operation proceeds to step S67.

In step S67, it is judged whether or not the region EMAX is 0, i.e., the terminal address of the terminal printer for emergency output is set. When the region EMAx is not 0, the operation proceeds to step S68. The print data of the reception buffer bufx are transmitted (transferred) to the terminal printer for emergency output which is designated by the read out EMA, and the operation then proceeds to step S63. By contrast, when it is judged in step S67 that the region EMAx is 0, the operation proceeds to step S63.

Although not shown in the flowchart, after an abnormality occurs in the print mechanism, the following control is conducted in step S63. Even when all the conditions for enabling reception are satisfied, a negative acknowledge is returned in order to prevent data which cannot be ensured to be printed, from being received, and reception of new data is suppressed during a period when the abnormality occurs. Similarly, during a period when the abnormality occurs, the printout cannot be conducted in step S64. Actually, therefore, the printout is skipped.

Figure 16:
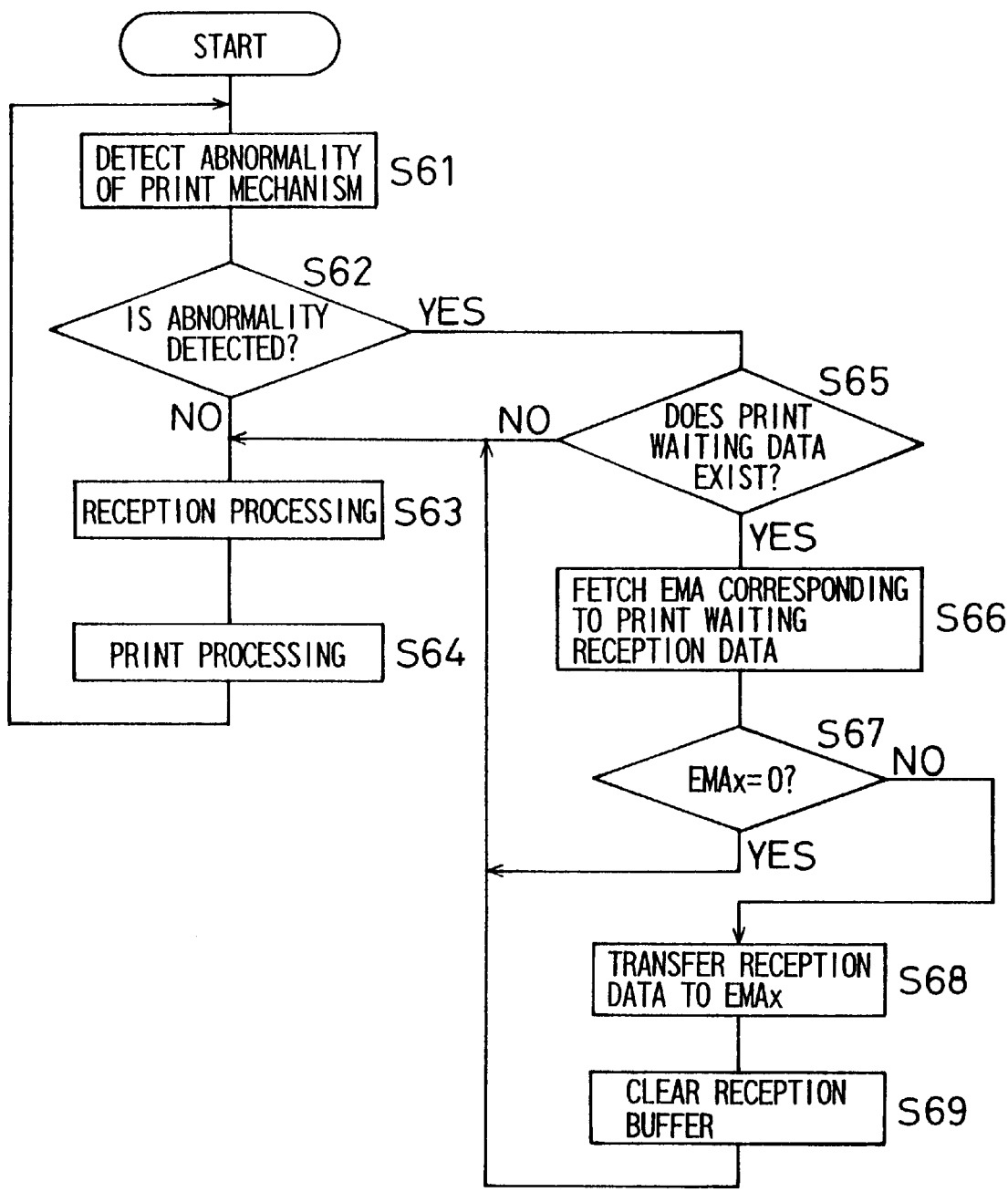
FIG. 16 is a flowchart showing an operation in the case where after transmission data from a HOST are normally received, print data which cannot be continuously subjected to printing are automatically transferred to the terminal printer for emergency output and print data which have been transferred and remain in the terminal printer are thereafter erased.

FIG. 16 is a flowchart showing an operation in the case where, after transmission data from a HOST are normally received, print data which cannot be continuously subjected to printing are automatically transferred to the terminal printer for emergency output, and print data which have been transferred and remain in the terminal printer are thereafter erased. The flowchart is configured by adding step S69 to the flowchart shown in FIG. 15.

After the reception data are transferred in step S68 to the terminal printer for emergency output, the operation proceeds to step S69 to erase the reception buffer bufx. The erasure of the reception buffer bufx is implemented by clearing the stored contents of the regions LPNx, bufxCA, and bufxHA of FIG. 14.

Figure 17:
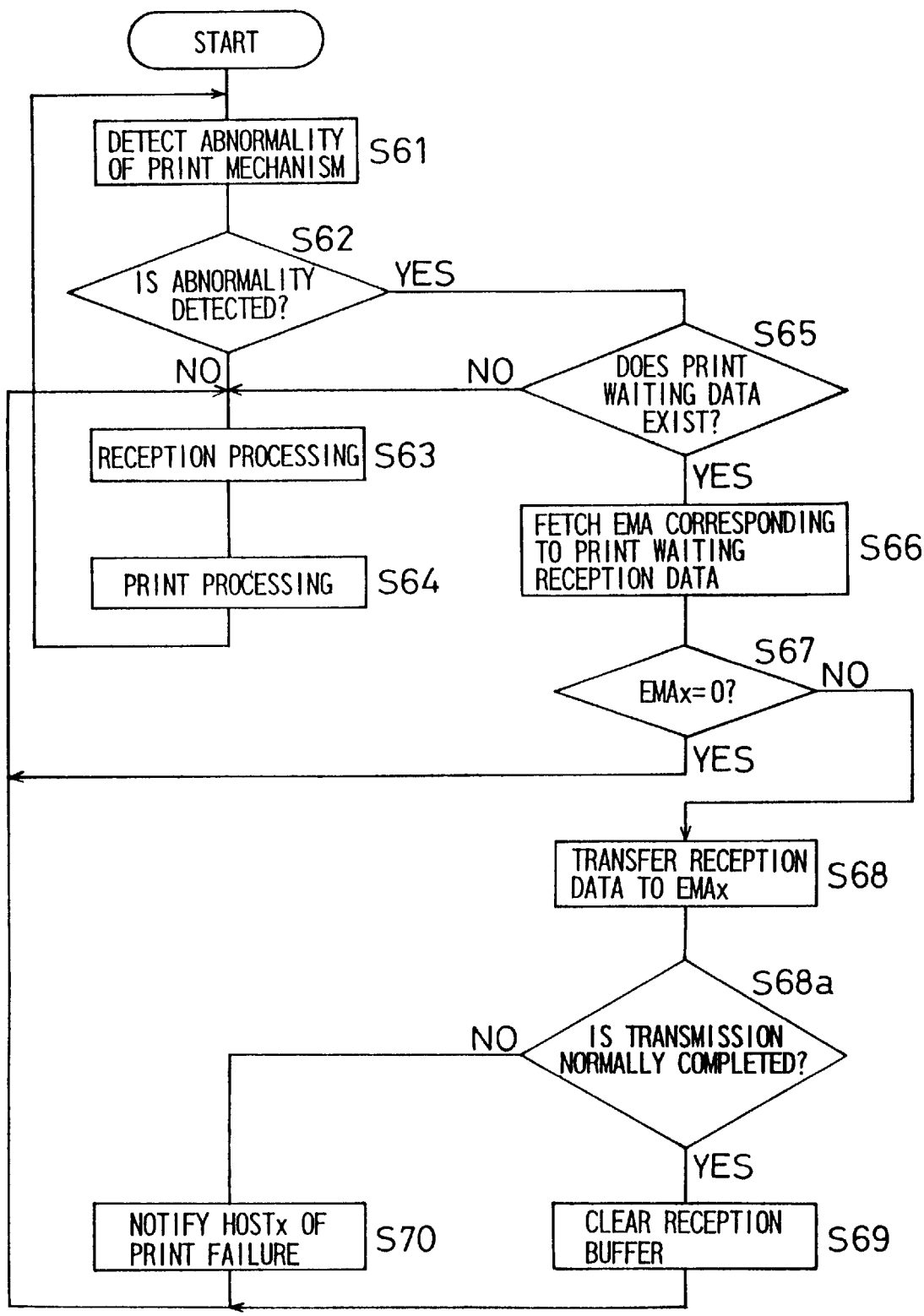
FIG. 17 is a flowchart showing an operation corresponding to a fifth embodiment of the invention.

FIG. 17 is a flowchart illustrating the whole control A operation of a terminal printer of a fifth embodiment of the invention. The terminal printer of the fifth embodiment is the same as that of the fourth embodiment except the print control operation. The components which are identical with those of the terminal printer of the fourth embodiment are designated by the same reference numerals and abbreviations and their detailed description is omitted. The embodiment corresponds to the fifth aspect of the invention described in the summary of the invention. The flowchart is configured by adding steps S68a and S70 to the flowchart shown in FIG. 16.

The reception data are transmitted in step S68 to the terminal printer for emergency output, and the operation then proceeds to step S68a to judge whether the transmission is normally executed or not. When the transmission is normally completed, the operation proceeds to step S69 in which the region bufx is erased. By contrast, when it is judged in step S68a that the transmission is not normally completed, the operation proceeds to step S70 in which the HOST transmitting the print waiting data is notified of the print failure, and the operation then returns to step S63.

Figure 18:
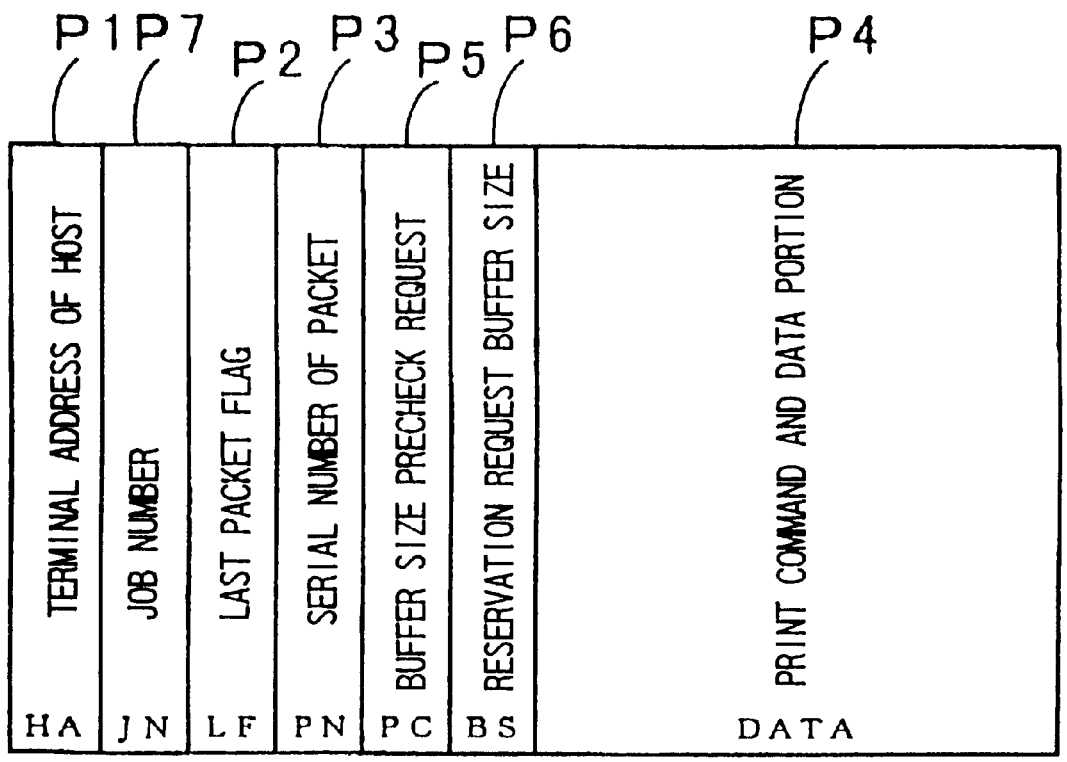
FIG. 18 is a view showing the configuration of a packet used in a control corresponding to a sixth embodiment of the invention.

FIG. 18 is a view showing the configuration of a packet which is transmitted to a terminal printer of a sixth embodiment of the invention. The terminal printer of the sixth embodiment is the same as that of the first embodiment except the packet configuration. The components which are identical with those of the terminal printer of the first embodiment are designated by the same reference numerals and abbreviations and their detailed description is omitted. The embodiment corresponds to the seventh aspect of the invention described in the summary of the invention.

The packet is configured by adding a field P7 for storing a JOB number JN of a HOST to the configuration of the first packet shown in FIG. 9. In a HOST having a function of multitask processing, in response to print requests from tasks and JOBs of different applications, numbers respectively specific to the tasks and JOBs are set in the field P5 by using the packet shown in FIG. 18. The print data are packetized by using the numbers and then transmitted to the terminal printer. The terminal printer handles information comprising the terminal address HA and the JOB number JN which are stored in the two fields P1 and P7, in the same manner as the case where only the expansion of the data length of HA is conducted, and the reception buffer allocation processing shown in FIGS. 2 and 3 is conducted by using this information in place of the terminal address. As a result, print data from the same HOST and having different JOB numbers can be received simultaneously.

Figure 19:
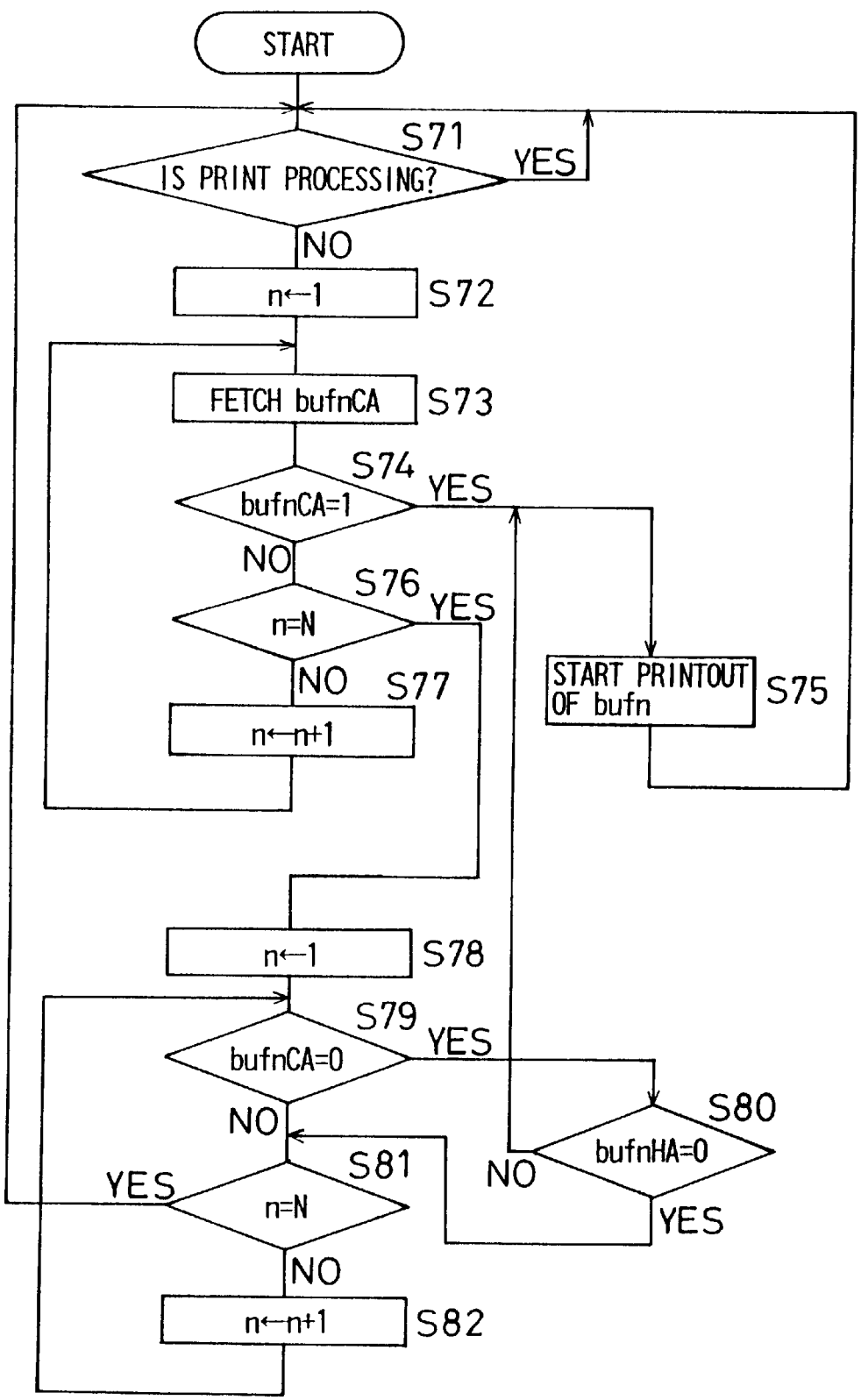
FIG. 19 is a flowchart showing an operation corresponding to a seventh embodiment of the invention.

FIG. 19 is a flowchart showing a print operation of a terminal printer of a seventh embodiment of the invention. The terminal printer of the seventh embodiment is the same as that of the fourth embodiment except the print operation. The components which are identical with those of the terminal printer of the fourth embodiment are designated by the same reference numerals and abbreviations and their detailed description is omitted. The embodiment corresponds to the aspect of the invention described in the summary of the invention.

In step S71, it is judged whether the printout is currently conducted or not, i.e., the print mechanism 7 is printing print data in one of the reception buffers or not. When the printout is not currently conducted, the operation proceeds to step S72. In step S72, the local argument n is initialized to be 1 in order to search the reception buffers buf1 to bufN for a reception buffer which completes reception of a series of print data and which is in the print waiting state. Thereafter, the operation proceeds to step S73. In step S73, the value of the region bufnCA (information indicative of the print state of the reception buffer bufn) is fetched by using n as an argument, and the operation then proceeds to step S74.

In step S74, it is judged whether the value of the region bufnCA indicates the print waiting state or not. When the value of the region bufnCA is 1 (the print waiting state), the operation proceeds to step S75 to execute the process of starting the printout of bufn and then returns to step S71. By contrast, when it is judged in step S74 that the value of the region bufnCA does not indicate the print waiting state, the operation proceeds to step S76 in which it is judged whether the search of all the reception buffers is completed or not.

When it is judged in step S76 that there is a reception buffer on which the search has not yet been conducted, the operation proceeds to step S77 to increment the argument n and then returns to step S73. By contrast, when it is judged in step S76 that the search of all the reception buffers is completed, the operation proceeds to step S78. In order to search for a reception buffer under reception, n is again initialized and the operation proceeds to step S79.

In step S79, it is checked whether there is a reception buffer in the reception completion waiting state (bufnCA=0) or not. When there is a reception buffer in the reception completion waiting state (bufnCA=0), the operation proceeds to step S80 to check that the reception buffer is in an unused state (bufnHA=0). When it is checked in step S80 that the reception buffer is not in the unused state, the operation proceeds to step S75 to execute the process of starting the printout of the print data of the reception buffer bufn and then returns to step S71.

When it is checked in step S79 that there is no reception buffer in the reception completion waiting state, and when it is checked in step S80 that the reception buffer bufn is in the unused state, the operation proceeds to step S81 to judge whether the search of all the reception buffers is completed or not. When it is judged in step S81 that the search of all the reception buffers is completed, the operation returns to step S71. By contrast, when it is judged in step S81 that there is a reception buffer on which the search has not yet been conducted, the operation proceeds to step S82 to increment n and then returns to step S79.

According to this configuration, print data in a reception buffer which has completed reception and which is in the print waiting state can be subjected to start printing before those in another reception buffer in which reception is currently conducted.

Figure 20:
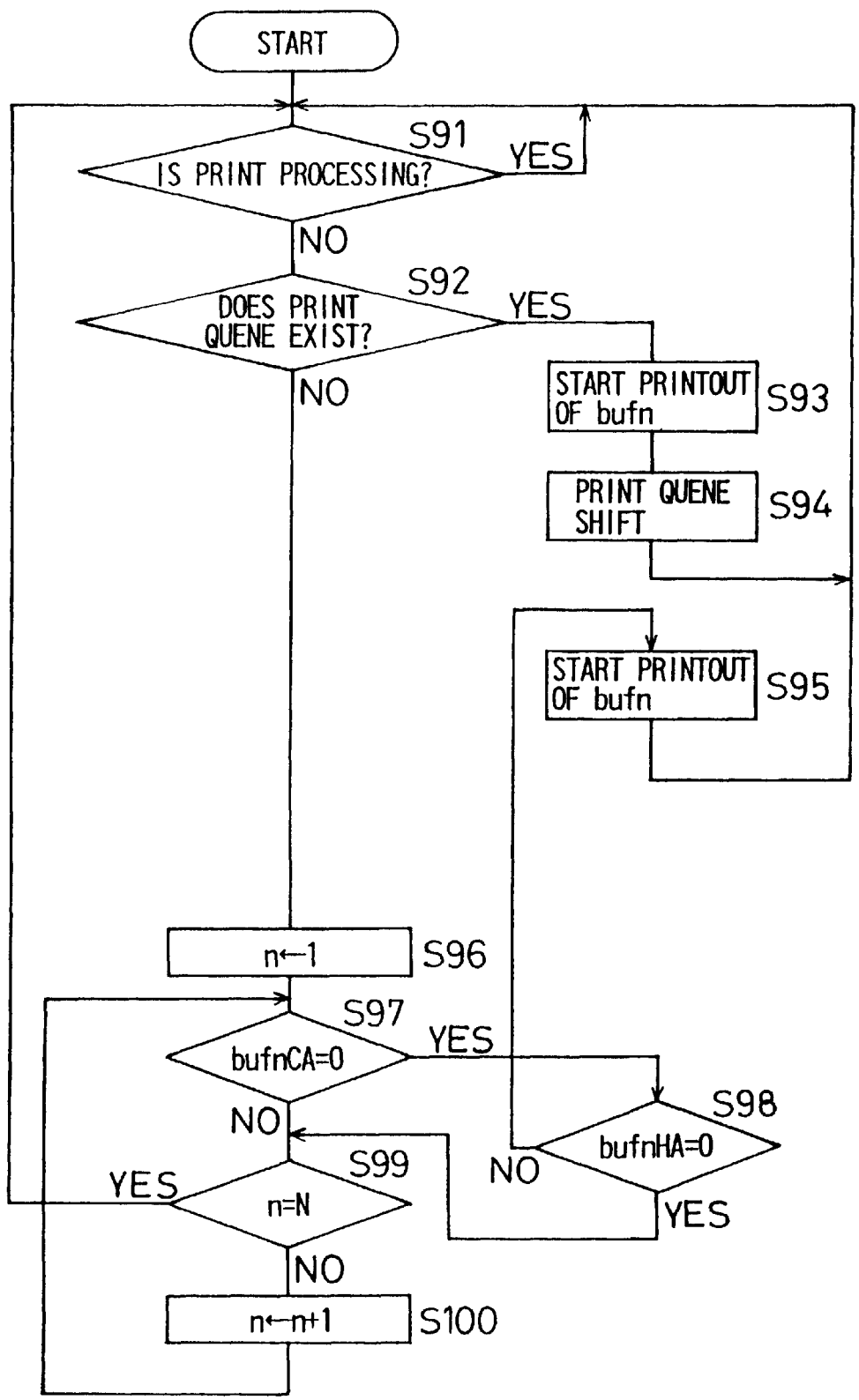
FIG. 20 is a flowchart of an operation in the case where a print queue is used for judging the sequence of reception completion times of a series of packets of an eighth embodiment of the invention.

FIG. 20 is a flowchart showing a print operation of a terminal printer of an eighth embodiment of the invention. The terminal printer of the eighth embodiment is the same as that of the seventh embodiment except the internal configuration of the RAM 4 and the print operation. The components which are identical with those of the terminal printer of the seventh embodiment are designated by the same reference numerals and abbreviations and their detailed description is omitted. The embodiment corresponds to the ninth aspect of the invention described in the summary of the invention. In the print operation, a print queue shown in FIG. 21 is used in order to judge the sequence of a series of packet reception management times.

Figure 21:
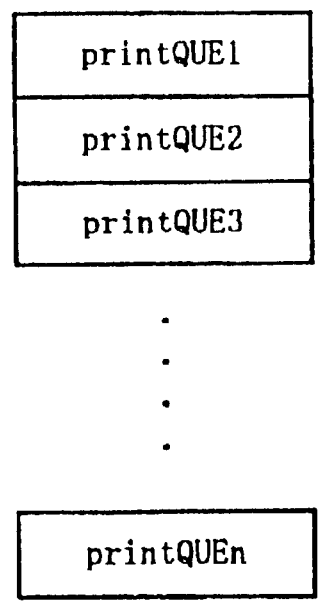
FIG. 21 is a view showing the configuration of the print queue used in the operation flowchart of FIG. 20.

The print queue shown in FIG. 21 is a region disposed in the RAM 4. The print queue is configured by n elements printQUE1 to printQUEn. When the LF (the last packet flag, see FIG. 18) of a packet is 1 after the packet is normally received, it is assumed that reception of a series of print data is completed. In the print queue, then, the number of the reception buffer is stored at the element printQUEm which is a first element of 0 with starting from the top of the print queue. As a result, the numbers of the reception buffers are arranged with starting from the top in the descending order of the reception time of the stored print data. An element at which the number of a reception buffer is stored is called a print waiting QUE.

Referring to FIG. 20, it is judged in step S91 whether the printout is being conducted or not. When the printout is not being conducted, the operation proceeds to step S92 in which it is judged whether there is a print waiting QUE or not. When there is a print waiting QUE, the operation proceeds to step S93. The printout of print data of the reception buffer the number of which is stored at the top print waiting QUE of the print queue is started. Thereafter, the operation proceeds to step S94. In step S94, the elements of the print queue are shifted by one element in the following manner. The oldest print waiting QUE is abandoned, and the second print waiting QUE is moved to the top element. Similarly, the third print waiting QUE is moved to the second element, . . . , and the m-th print waiting QUE is moved to the (m−1)th element. A value (0) indicating that no print waiting QUE exists is stored at the m-th element. Thereafter, the operation returns to step S91 to repeat the process above.

By contrast, when it is judged in step S92 that the print queue is empty, the operation proceeds to step S96. In order to search for a reception buffer under reception, n is again initialized and the operation proceeds to step S97. The processes of steps S97 to S100 are identical with those of steps S79 to S82 shown in FIG. 19 and hence their description is omitted.

According to this configuration, it is possible to print out print data which have been received and wait for printout, in a temporal descending sequence.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A terminal printer connected to a plurality of host devices via an interface configured by a single line, the terminal printer receiving transmission data from the respective host devices in a form of one or more packets for printing via a print mechanism, wherein the transmission data contains print data to be printed and station numbers for identifying the respective host devices, the terminal printer comprising:

a reception buffer memory divided into a plurality of allocation regions in a data region based on a number of the host devices;

a buffer management memory which stores the station numbers of the host devices and the allocation regions of the reception buffer memory in correspondence with each other, wherein each time a packet is received, a station number of a host device in the packet is compared with the station numbers of the host devices stored in the buffer management memory to store the packet in an allocation region corresponding to a coincident station number;

a capacity information storing unit that stores information indicating capacities of the respective allocation regions which are allocated in the reception buffer memory in correspondence with the station numbers; and a capacity changing unit that, when a capacity of the allocation region becomes insufficient in a course of reception of transmission data, changes information indicating the capacity of the allocation region, wherein capacities of the allocation regions of the reception buffer memory which are allocated to the host devices can be changed on the basis of the information stored in the capacity information storing unit.

2. The terminal printer of claim 1, wherein a top packet which is first transmitted from the host device comprises reception buffer allocation control information for designating whether or not a capacity required for storing all the transmission data is to be reserved in an allocation region corresponding to a station number of the host device, the top packet further comprising information indicating a total capacity of the transmission data, and wherein when reservation of the capacity of the allocation region is designated by the reception buffer allocation control information, the capacity information of the allocation region which is stored in the capacity information storing unit is changed by the capacity changing unit on the basis of the information indicating the total capacity of the transmission data before starting reception of a subsequent packet.

3. The terminal printer of claim 1, further comprising:

a printer management memory for storing a station number of a terminal printer for emergency output corresponding to the station numbers of the host devices connected to the interface;

a breakdown detecting unit that detects a breakdown of the print mechanism; and a transfer printing unit that, when the breakdown detecting unit detects a breakdown of the print mechanism, transfers print data in a print-disabled state to the corresponding terminal printer for emergency output in accordance with the station number of the terminal printer for emergency output which is stored in the printer management memory, thereby allowing the print data to be printed.

4. The terminal printer of claim 3, further comprising a notifying unit that, when the station number of the terminal printer for emergency output is not set in the printer management memory or print data cannot be transferred to the terminal printer for emergency output when the breakdown detecting unit detects a breakdown of the print mechanism, notifies the host device which has transmitted transmission data including the print data in the print-disabled state, that printing has not been conducted.

5. The terminal printer of claim 1, further comprising a notifying unit that, when the print mechanism fails to continue printing of print data after transmission data from one of the plurality of host devices are received, notifies the one host device that the print data cannot be printed.

6. The terminal printer of claim 1, further comprising:
  a print sequence management memory that stores a print sequence that is set on the basis of data indicating that reception of a series of packets is completed; and
  a sequence management print controlling unit that causes the print mechanism to conduct printing of each print data in accordance with the print sequence stored in the print sequence management memory.

7. A terminal printer connected to a plurality of host devices via an interface configured by a single line, the terminal printer receiving transmission data from the respective host devices in a form of one or more packets for printing via a print mechanism, wherein the transmission data contains print data to be printed and station numbers for identifying the respective host devices, the terminal printer comprising:
  a reception buffer memory divided into a plurality of allocation regions in a data region based on a number of the host devices;
  a buffer management memory which stores the station numbers of the host devices and the allocation regions of the reception buffer memory in correspondence with each other, wherein each time a packet is received, a station number of a host device in the packet is compared with the station numbers of the host devices stored in the buffer management memory to store the packet in an allocation region corresponding to a coincident station number, wherein a packet of data transmitted from a host device contains an identification number of an application function of the host device;
  a memory controlling unit that uses the reception buffer memory in a divided manner on the basis of a station number of the host device included in the packet and the identification number; and
  a plurality of print data which are to be subjected to concurrent processing are simultaneously received from the same host device and respectively stored in divided regions of the reception buffer memory.

8. A terminal printer connected to a plurality of host devices via an interface configured by a single line, the terminal printer receiving transmission data from the respective host devices in a form of one or more packets for printing via a print mechanism, wherein the transmission data contains print data to be printed and station numbers for identifying the respective host devices, the terminal printer comprising:
  a reception buffer memory divided into a plurality of allocation regions in a data region based on a number of the host devices;
  a buffer management memory which stores the station numbers of the host devices and the allocation regions of the reception buffer memory in correspondence with each other, wherein each time a packet is received, a station number of a host device in the packet is compared with the station numbers of the host devices stored in the buffer management memory to store the packet in an allocation region corresponding to a coincident station number;
  a print state management memory that stores one from among a print completion state, a print waiting state, and a printing state in correspondence with each station numbers of the plurality of host devices connected to the interface;
  a state setting unit that sets the print waiting state in the print state management memory on the basis of a notification that transmission of a series of packets from the host devices is completed; and
  a state management print controlling unit that causes a packet whose reception is completed in an allocation region, to be subjected to start of printing prior to a packet of an allocation region which is in the course of reception, on the basis of the print state stored in the print state management memory.

* * * * *